United States Patent
Côté

(10) Patent No.: US 12,030,246 B2
(45) Date of Patent: Jul. 9, 2024

(54) MODULAR ADDITIVE MANUFACTURING SYSTEM AND RELATED METHODS FOR CONTINUOUS PART PRODUCTION

(71) Applicant: 9328-8082 QUÉBEC INC., Québec (CA)

(72) Inventor: Samuel Côté, Québec (CA)

(73) Assignee: 9328-8082 QUÉBEC INC., Québec (CA)

( * ) Notice: Subject to any disclaimer, the term of this patent is extended or adjusted under 35 U.S.C. 154(b) by 0 days.

(21) Appl. No.: 17/661,500

(22) Filed: Apr. 29, 2022

(65) Prior Publication Data

US 2022/0258417 A1 Aug. 18, 2022

Related U.S. Application Data

(62) Division of application No. 16/406,366, filed on May 8, 2019, now Pat. No. 11,351,728.

(Continued)

(51) Int. Cl.
*B29C 64/182* (2017.01)
*B22F 12/00* (2021.01)
(Continued)

(52) U.S. Cl.
CPC .......... *B29C 64/182* (2017.08); *B22F 12/224* (2021.01); *B22F 12/226* (2021.01);
(Continued)

(58) Field of Classification Search
CPC ... B29C 64/182; B29C 64/232; B29C 64/245; B29C 64/393; B29C 64/236; B29C 64/241; B29C 64/277; B29C 64/268; B33Y 10/00; B33Y 30/00; B33Y 40/00; B33Y 50/02; B22F 12/226; B22F 12/86; B22F 12/44;
(Continued)

(56) References Cited

U.S. PATENT DOCUMENTS 5,348,693 A 9/1994 Taylor et al.
7,255,551 B2 8/2007 Taylor et al.
(Continued)

FOREIGN PATENT DOCUMENTS

| EP | 2892708 A1 | 7/2015 |
| EP | 3315294 A1 | 5/2018 |
| WO | 2017102875 A1 | 6/2017 |

OTHER PUBLICATIONS

Partial European Search Report issued for patent application No. EP 19 173 336.9; May 8, 2019.

*Primary Examiner* — Nahida Sultana
*Assistant Examiner* — Lawrence D. Hohenbrink, Jr.
(74) *Attorney, Agent, or Firm* — Nixon & Vanderhye P.C.

(57) ABSTRACT

Modular additive manufacturing systems, related methods for simultaneously building three-dimensional parts in successively bonded layers, and related computer readable storage medium. A plurality of build assemblies is laid out along at least one direction of a manufacturing path defining a loop, and at least one build assembly is functioning to build a three-dimensional part from build material according to build instructions. A guidable module is guided via a guiding assembly along the manufacturing path to repeatedly perform at least one step necessary to build the three-dimensional part on each functioning build assembly.

10 Claims, 12 Drawing Sheets

Related U.S. Application Data

(60) Provisional application No. 62/668,487, filed on May 8, 2018.

(51) Int. Cl.

| | | |
|---|---|---|
| *B22F 12/44* | (2021.01) | |
| *B22F 12/49* | (2021.01) | |
| *B22F 12/84* | (2021.01) | |
| *B22F 12/86* | (2021.01) | |
| *B22F 12/90* | (2021.01) | |
| *B29C 64/232* | (2017.01) | |
| *B29C 64/236* | (2017.01) | |
| *B29C 64/241* | (2017.01) | |
| *B29C 64/245* | (2017.01) | |
| *B29C 64/268* | (2017.01) | |
| *B29C 64/277* | (2017.01) | |
| *B29C 64/393* | (2017.01) | |
| *B33Y 40/00* | (2020.01) | |
| *B22F 12/30* | (2021.01) | |
| *B22F 12/52* | (2021.01) | |
| *B33Y 10/00* | (2015.01) | |
| *B33Y 30/00* | (2015.01) | |
| *B33Y 50/02* | (2015.01) | |

(52) U.S. Cl.
CPC ............ *B22F 12/44* (2021.01); *B22F 12/49* (2021.01); *B22F 12/84* (2021.01); *B22F 12/86* (2021.01); *B22F 12/90* (2021.01); *B29C 64/232* (2017.08); *B29C 64/236* (2017.08); *B29C 64/241* (2017.08); *B29C 64/245* (2017.08); *B29C 64/268* (2017.08); *B29C 64/277* (2017.08); *B29C 64/393* (2017.08); *B33Y 40/00* (2014.12); *B22F 12/30* (2021.01); *B22F 12/52* (2021.01); *B33Y 10/00* (2014.12); *B33Y 30/00* (2014.12); *B33Y 50/02* (2014.12)

(58) Field of Classification Search
CPC .......... B22F 12/49; B22F 12/90; B22F 12/84; B22F 12/224; B22F 12/30; B22F 12/52
USPC ........................................ 264/297.8
See application file for complete search history.

(56) References Cited

U.S. PATENT DOCUMENTS

| | | |
|---|---|---|
| 8,888,480 B2 | 11/2014 | Yoo et al. |
| 8,974,213 B1 | 3/2015 | Yakubov et al. |
| 9,085,109 B2 | 7/2015 | Schmehl et al. |
| 9,604,411 B2 | 3/2017 | Rogren |
| 2008/0109102 A1 | 5/2008 | Sutcliffe |
| 2012/0072006 A1 | 3/2012 | Knighton |
| 2016/0200084 A1 | 7/2016 | Hays et al. |
| 2016/0207258 A1 | 7/2016 | Handa |
| 2016/0311159 A1 | 10/2016 | Spanier et al. |
| 2016/0332375 A1 | 11/2016 | Juan et al. |
| 2016/0339640 A1 | 11/2016 | Juan et al. |
| 2017/0028472 A1 | 2/2017 | Shaw et al. |
| 2017/0050386 A1 | 2/2017 | Houben et al. |
| 2017/0095979 A1 | 4/2017 | Sasaki |
| 2017/0239932 A1* | 8/2017 | Knecht ............... B33Y 30/00 |
| 2018/0141275 A1 | 5/2018 | Patel et al. |
| 2018/0229431 A1* | 8/2018 | Amaya ............... B33Y 30/00 |
| 2020/0338813 A1 | 10/2020 | Counts et al. |

* cited by examiner

MODULAR ADDITIVE MANUFACTURING SYSTEM AND RELATED METHODS FOR CONTINUOUS PART PRODUCTION

CROSS RELATED APPLICATIONS

This application is a Divisional of U.S. patent application Ser. No. 16/406,366, filed May 8, 2019, now allowed, which claims priority to U.S. Provisional Patent Application Ser. No. 62/668,487, filed May 8, 2018, the entire contents of each of which are hereby incorporated by reference.

TECHNICAL FIELD

The technical field generally relates to the manufacturing of parts using additive manufacturing techniques. More particularly, it relates to a modular additive manufacturing system and related methods for building, in a continuous manner, multiple three-dimensional parts simultaneously.

BACKGROUND

Additive manufacturing is a term that encompasses a variety of processes in which material is either deposited, cured, melted or sintered in layers according to a digital model. Additive manufacturing processes differ from traditional manufacturing by adding material to build a part instead of removing material or deform material to form said part. Various post-treatment steps can be performed to remove the built part, clean it and give it the desired properties (visual, mechanical, etc.).

Additive manufacturing devices and systems usually comprise a build area, zone, plate, substrate or vat to build parts via selective material deposition and solidifying. For example, a print head can selectively deposit material onto the build area or onto a previous material layer. In another example, a laser can scan a portion of the build area to cure, melt or sinter a corresponding portion of material layer. Then, a new layer of material is spread or deposited on the first layer and so on, until the part is complete. Generally, the print head can move with respect to the build area along three axes, which are the X-axis, Y-axis and Z-axis, the Z-axis being usually a vertical axis. Specific additive manufacturing devices include a print head which movable along up to five axes.

The building area of an additive manufacturing device is typically a single zone onto which layers of material are successively deposited and bonded during a cycle process time which is the sum of the deposition time and bonding time. In addition, when a part is completed on a build area, operations for removing the part for subsequent manufacturing of a new part on the same build area can imply turning off the production time for a given period. As a result, the production speed and yield are relatively low, which makes large scale production expensive and prevents most additive manufacturing processes from becoming economically viable for industrial mass production.

In view of the above, there is a need for an additive manufacturing system which, by virtue of its design, components and operation, would be able to overcome or at least minimize some of the above-discussed concerns.

SUMMARY

In one aspect, there is provided a modular additive manufacturing system for simultaneously building three-dimensional parts in successively bonded layers. The system includes:
- a plurality of build assemblies laid out along at least one direction of a manufacturing path defining a loop, at least one build assembly being functioning to build a three-dimensional part from build material according to build instructions;
- a guidable module repeatedly performing at least one step necessary to build the three-dimensional part on each functioning build assembly along the manufacturing path; and
- a guiding assembly operatively connected to the guidable module to guide the module along the manufacturing path at a distance with respect to the build assemblies, thereby enabling successive layering and bonding of the build material on each functioning build assembly.

In some implementations of the modular system, the guidable module is a bonding module which is guided by the guiding assembly and periodically performs bonding of the layer of build material on each functioning build area to form a bonded layer; and wherein each build assembly comprises a layer deposition device being triggerable, after bonding of the layer of build material by the bonding module, to perform deposition of a new layer of material.

In some implementations of the modular system, the guidable module is a layer deposition device which is guided by the guiding assembly and periodically performs deposition of build material on each functioning build area to form a new layer of material; and each build area comprises a bonding module being triggerable, after deposition of the new layer of build material by the layer deposition device, to perform selective bonding of the new layer of material.

In some implementations of the modular system, the guiding assembly comprising sliding elements and/or rotating elements which are engageable with the guidable module to guide the guidable module along the manufacturing path via translation and/or rotation of the guidable module.

In some implementations of the modular system, the manufacturing path is of rectangular, discorectangular, polygonal or circular shape.

In some implementations of the modular system, build assemblies are arranged in two parallel rows along an X-axis and the guidable module is guided via translation with respect to the guiding assembly and build assemblies, and the guiding assembly comprises:
- a pair of spaced apart guiding rails extending longitudinally along the X-axis;
- a transversal guiding rail extending longitudinally along a Y-axis;
- a pair of translation connectors, each translation connector being provided at one end of the transversal guiding rail to connect the end to one guiding rail and ensure translation of the transversal guiding rail between the pair of guiding rails; and
- a sliding module connector configured to connect the guidable module to the transversal guiding rail and ensure translation of the guidable module with respect to the transversal guiding rail along the Y-axis.

In some implementations of the modular system, build assemblies are arranged in two parallel rows along an X-axis and the guidable module is guided via translation and rotation with respect to the guiding assembly and build assemblies, the guiding assembly comprising:
- a chain, belt or linear motor stator defining the manufacturing path;
- a set of sprockets, pinions or a rotor engageable with the chain belt or linear motor stator respectively to advance the chain, belt or rotor along the manufacturing path upon actuation of the sprockets, pinions or stator; and a rotation electrical connector connecting the guidable module to the control and processing unit, and enabling rotation of the guidable module about a Z-axis while being displaced along the manufacturing path.

In some implementations of the modular system, the build assemblies are arranged in a star-like configuration with the manufacturing path being of circular shape, and the guiding assembly comprises:
- a base centrally located with respect to the build assemblies and rotatable about a Z-axis;
- an elongated arm having a proximal end connected to the base and a distal end connected to the guidable module, the rotation of the base enabling the guidable module to follow the circular manufacturing path above or below the build assemblies.

In some implementations of the modular system, each build assembly comprise a build module comprising a feed platform holding the build material; and a build platform configured for receiving vertically stacked layers of build material.

In some implementations of the modular system, the build platform of each one of the build modules is vertically translatable and comprises a layer height detector for detecting a height of stacked layers and generating a height signal when a predetermined height is reached on the build platform.

In some implementations of the modular system, the system further comprises a control and processing unit communicating with at least one of the build assemblies, guidable module and guiding assembly, the control and processing unit comprising a computer readable storage medium storing the build instructions and a processor executing the building instructions to cyclically trigger deposition of a new layer of build material by the layer deposition device, bonding of the new layer of build material by the bonding module, and motion of the guidable module along the manufacturing path.

In some implementations of the modular system, the system further comprises sensors providing information to the control and processing unit on a position of at least one of the guidable module and elements of the build assemblies, the control and processing unit being able to synchronize actions of the build assemblies with respect to the position of the guidable module and vice-versa.

In some implementations of the modular system, each build assembly comprises a sensor generating a bonding signal when a layer of build material is bonded by the bonding module, the emission of the bonding signal triggering, via the control and processing unit, deposition of a new layer of build material on each build assembly via the layer deposition device.

In some implementations of the modular system, the guidable module is a first guidable module and the system further comprises at least one additional bonding module mountable to the guiding assembly and guidable along the manufacturing path.

In another aspect, there is provided a method for simultaneously building three-dimensional parts in successively bonded layers based at least on build instructions, the method comprising the steps of:
- providing a plurality of build assemblies along a manufacturing path defining a loop;
- enabling at least one build assembly to function according to the build instructions;
- depositing a top layer of build material on the plurality of build assemblies in response to the build instructions for each functioning build assemblies;
- displacing a bonding module along the manufacturing path and at a distance with respect to the build assemblies;
- successively bonding the top layer of build material from each functioning build assembly via activation of the bonding module along the manufacturing path, thereby enabling repeated layering and bonding of the build material on each functioning build assembly until completion of a three-dimensional part;

wherein the bonding of the top layer of build material from one build assembly is performed simultaneously to the deposition of the top layer of build material on remaining build assemblies.

In some implementations of the method, the method comprises syncing the displacement of the bonding module and the deposition of the top layer of build material on each build assembly so as to activate the bonding module as soon as each top layer of build material is deposited along the manufacturing path.

In some implementations of the method, the method comprises replacing one build assembly with a new build assembly upon completion of the three-dimensional part on said build assembly, thereby enabling removal of the three-dimensional part without interrupting production of the three-dimensional parts of the build assemblies along the manufacturing path.

In some implementations of the method, the method comprises reducing a size of the manufacturing path to only cover the functioning build assemblies.

In some implementations of the method, the method comprises generating a signal or computer readable instructions upon completion of at least one of a layering or bonding operation on one build assembly, and activating a subsequent deposition or layering operation on said build assembly based on said signal or computer readable instructions.

In some implementations of the method, the method comprises sensing a position of the bonding module and syncing deposition of the top layer of build material on each functioning build assembly based on the sensed position.

In another aspect, there is provided a computer readable storage medium having stored thereon build instructions that, when executed by a processor, cause the processor to perform a method for building three-dimensional parts in successively bonded layers based at least on build instructions, the method comprising:
- activating, by the processor, deposition of a top layer of build material on at least one functioning build assembly among a plurality of build assemblies organized along a manufacturing path defining a loop;
- displacing, by the processor, a bonding module along the manufacturing path and at a distance with respect to the build assemblies;
- activating, by the processor, the bonding module while being displaced to perform successive bonding of the top layer of build material on each functioning build assembly along the manufacturing path.

In some implementations of the medium, the processor comprises a first processing entity executing method steps relating to the bonding of build material; and a second processing entity executing method steps related to the motion of the modules and enablement of electronic components.

In some implementations of the medium, the method comprises activating, by the processor, any one of the steps of the method as defined in any one of claims 15 to 20.

In another aspect, there is provided a computer device for building three-dimensional parts in successively bonded layers based at least on build instructions, the computer device comprising a processor; and the computer readable storage medium as defined herein, the computer readable storage medium being operatively coupled to the processor.

In another aspect, there is provided an additive manufacturing system for building, in a continuous manner, three-dimensional parts in successively bonded layers based on part build instructions, the system comprising:
- a plurality of build assemblies, each build assembly comprising a layer deposition device to deposit a top layer of build material on a build area;
- a light emitting device emitting light for bonding the top layer of build material on each build assembly; and
- an optical assembly directing the light emitted by the light emitting device towards the top layer of build material from each build assembly, the optical assembly being selectively actuated to let the light being directed to at least one build assembly upon deposition of the top layer of build material on the at least one build assembly.

In some implementations of the system, the optical assembly comprises switchable mirrors and XY scanning mirrors, the switchable mirrors being placed between two opposed rows of build assemblies so as to have at least one switchable mirror adjacent to a build assembly to direct the light emitted by the light emitting device to one XY scanning mirror positioned on the build area to direct said light towards the top layer of build material; wherein the switchable mirrors are selectively switched to let the light being directed to the at least one build assembly upon deposition of the top layer of build material on said build assembly.

In some implementations of the system, the optical assembly comprises a spinning mirror and XY scanning mirrors, to spinning mirror being placed between the two opposed rows of build assemblies to selectively direct the light emitted by the light emitting device to one XY scanning mirror positioned on the build area to direct said light towards the top layer of build material.

In some implementations of the system, the light emitting device is a laser or a light projector.

In some implementations of the system, the build assemblies are organized as two parallel rows.

In some implementations of the system, the build assemblies are organized in a star like configuration.

In some implementations of the system, the switchable mirror is a pivotable mirror or a lens that is selectively rendered opaque.

In all implementations, the yield of part production is optimized because the present system is able to continuously produce parts in accordance with the longest cycle between a layer deposition cycle time and the sum of a layer bonding cycle time and the interference time, in comparison to a system where the yield of part production is ruled by the sum of the layer deposition cycle time, the layer bonding cycle time and various time delays between cycles.

In another aspect, there is provided an additive manufacturing system for building, in a continuous manner, three-dimensional parts in successively bonded layers based at least on build instructions. The system includes a plurality of build modules mountable to the framework, each build module comprising a feed platform holding build material; and a build platform configured for receiving vertically stacked layers of build material. The system further includes a plurality of layer deposition devices mountable to the framework, each layer deposition device being engageable with one of the build modules, the plurality of layer deposition devices being configured for depositing build material from the feed platform to the build platform of a respective one of the build modules and generating a bonding signal indicating a completed layering operation. The system further includes a bonding module mountable to the framework and movable according to a continuous manufacturing path along the build platform of each one of the plurality of adjacent build modules, the bonding module being configured to selectively bond the build material layered on the build platform of each one of the plurality of adjacent build modules according at least to the part build instructions when receiving the bonding signal and to activate a subsequent layering operation, thereby enabling successive layering and bonding of the build material on different build modules.

In some implementations, the framework comprises guiding rails shaped and sized to receive the bonding module and guide the bonding module from a build area to adjacent build areas along the continuous manufacturing path.

In some implementations, the guiding rails comprise a guiding rail extending longitudinally along an X-axis and a guiding rail extending longitudinally along a Y-axis, the plurality of adjacent build modules being arranged in parallel rows along the X-axis.

In some implementations, the guiding rail extending along the X-axis is stationary and the guiding rail extending along the Y-axis is movable along the X-axis. The bonding module can be mountable to the guiding rail extending along the Y-axis and is movable therealong.

In some implementations, the build modules are removably mounted to the framework. The framework can comprise a guiding structure and each one of the plurality of adjacent build modules comprises guiding elements shaped and sized for engaging with the guiding structure.

In some implementations, the build platform of each one of the plurality of adjacent build modules is vertically translatable and comprises a layer height detector for detecting a height of stacked layers and generating a height signal when a predetermined height is reached on a build module, thereby disengaging the build module from the guiding structure to remove the build module from the framework and enable subsequent insertion of another build module engaging with the guiding structure.

In some implementations, the system further comprises an additional bonding module mountable to the framework and movable according to the continuous manufacturing path along the build platform of each one of the plurality of adjacent build modules.

In another aspect, there is provided a method for building, in a continuous manner, three-dimensional parts in successively bonded layers based at least on part build instructions. The method includes the steps of a) providing a system comprising a framework; a plurality of adjacent build modules mountable to the framework, a plurality of layer deposition devices mountable to the framework, each layer deposition device being engageable with one of the build modules; and a bonding module mountable to the framework. Each build module comprises a feed platform holding build material, and a build platform configured for receiving vertically stacked layers of build material. The method further comprises the step of b) successively depositing build material on the build platform of adjacent build modules by engaging the layer deposition devices with build material held on the feed platform to the build platform of a respective one of the build modules in a layer. The method further comprises the steps of c) generating a bonding signal indicating a completed layering operation; d) moving the bonding module according to a continuous manufacturing path along the build platform of each one of the plurality of adjacent build modules; e) selectively bonding the build material layered on the build platform of each one of the plurality of adjacent build modules according at least to part build instructions when receiving the bonding signal; and f) activating a subsequent layering operation, thereby enabling successive layering and bonding of the build material on different build modules.

In some implementations, the framework comprises a guiding structure and each one of the plurality of adjacent build modules comprises guiding elements shaped and sized for engaging with the guiding structure, the method further comprising the step of generating a height signal enabling disengagement of a build module from the guiding structure of the framework and subsequent engagement of another build module with the guiding structure.

In another aspect, there is provided an additive manufacturing system for building, in a continuous manner, three-dimensional parts in successively bonded layers based on part build instructions. The system includes a framework; a plurality of adjacent build modules mountable to the framework; and a bonding module mountable to the framework, the bonding module being configured to selectively bond build material layered on the plurality of adjacent build modules according to the part build instructions and to a continuous manufacturing path along the plurality of adjacent build modules and to activate a subsequent layering operation, thereby enabling successive layering and bonding of the build material on different build modules.

In some implementations, the system comprises an optical component cooperating with the bonding module to selectively bond build material. The bonding module can comprise a light emitting device and the optical component comprises a mirror system, the mirror system directing the light emitted by the light emitting device towards the build material.

In some implementations, the system further comprises a layer deposition device configured for depositing build material on each one of the plurality of adjacent build modules and generating a bonding signal indicating a completed layering operation, the bonding module selectively bonding the build material layered on each one of the plurality of adjacent build modules when receiving the bonding signal.

In some implementations, each one of the plurality of build modules comprises a feed platform holding build material; a build platform configured for receiving vertically stacked layers of build material; and a layer deposition device configured for depositing build material from the feed platform to the build platform and generating a bonding signal indicating a completed layering operation. The bonding module selectively bonds the build material layered on the build platform of each one of the plurality of adjacent build modules when receiving the bonding signal.

In some implementations, wherein the build modules are removably mounted to the framework. The framework can comprise a guiding structure and each one of the plurality of adjacent build modules comprises guiding elements shaped and sized for engaging with the guiding structure. In some implementations, the system comprises a build detector generating a signal to disengage a build module from the framework and enable subsequent insertion of another build module engaging with the framework.

In some implementations, the build platform of each one of the plurality of adjacent build modules is vertically translatable and the build detector comprises a layer height detector for detecting a height of stacked layers and generating a height signal when a predetermined height is reached on a build module, thereby disengaging the build module from the guiding structure to remove the build module from the framework and enable subsequent insertion of another build module engaging with the guiding structure.

In some implementations, the bonding module is movable according to the continuous manufacturing path along the build platform of each one of the plurality of adjacent build modules. The framework can comprise guiding rails shaped and sized to receive the bonding module and guide the bonding module from a build platform to adjacent build platforms along the continuous manufacturing path. The guiding rails may comprise a guiding rail extending longitudinally along an X-axis and a guiding rail extending longitudinally along a Y-axis, the plurality of adjacent build modules being arranged in parallel rows along the X-axis. For example, the guiding rail extending along the X-axis can be stationary and the guiding rail extending along the Y-axis is movable along the X-axis. In some implementations, the bonding module is mountable to the guiding rail extending along the Y-axis and is movable therealong.

In some implementations, the system further comprises an additional bonding module mountable to the framework and movable along the continuous manufacturing path.

In another aspect, there is provided an additive manufacturing system for building, in a continuous manner, three-dimensional parts in successively bonded layers based at least on part build instructions. The system comprises a framework; a plurality of adjacent build modules mountable to the framework; a plurality of layer deposition devices mountable to the framework, each layer deposition device being engageable with one of the build modules, and a bonding module mountable to the framework and movable according to a continuous manufacturing path along the build platform of each one of the plurality of adjacent build modules. Each build module comprises a feeding device holding build material; a build platform configured for receiving vertically stacked layers of build material. The plurality of layer deposition devices is configured for depositing build material from the feeding device to the build platform of a respective one of the build modules and generating a bonding signal indicating a completed layering operation. The bonding module is configured to selectively bond the build material layered on the build platform of each one of the plurality of adjacent build modules according at least to the part build instructions when receiving the bonding signal and to activate a subsequent layering operation, thereby enabling successive layering and bonding of the build material on different build modules.

While the invention will be described in conjunction with example embodiments and implementations, it will be understood that it is not intended to limit the scope of the invention to such embodiments or implementations. On the contrary, it is intended to cover all alternatives, modifications and equivalents as may be included as defined by the present description. The objects, advantages and other features of the present invention will become more apparent and be better understood upon reading of the following non-restrictive description of the invention, given with reference to the accompanying drawings.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

It will be noted that throughout the appended drawings, like features are identified by like reference numerals.

DETAILED DESCRIPTION

Figure 1:
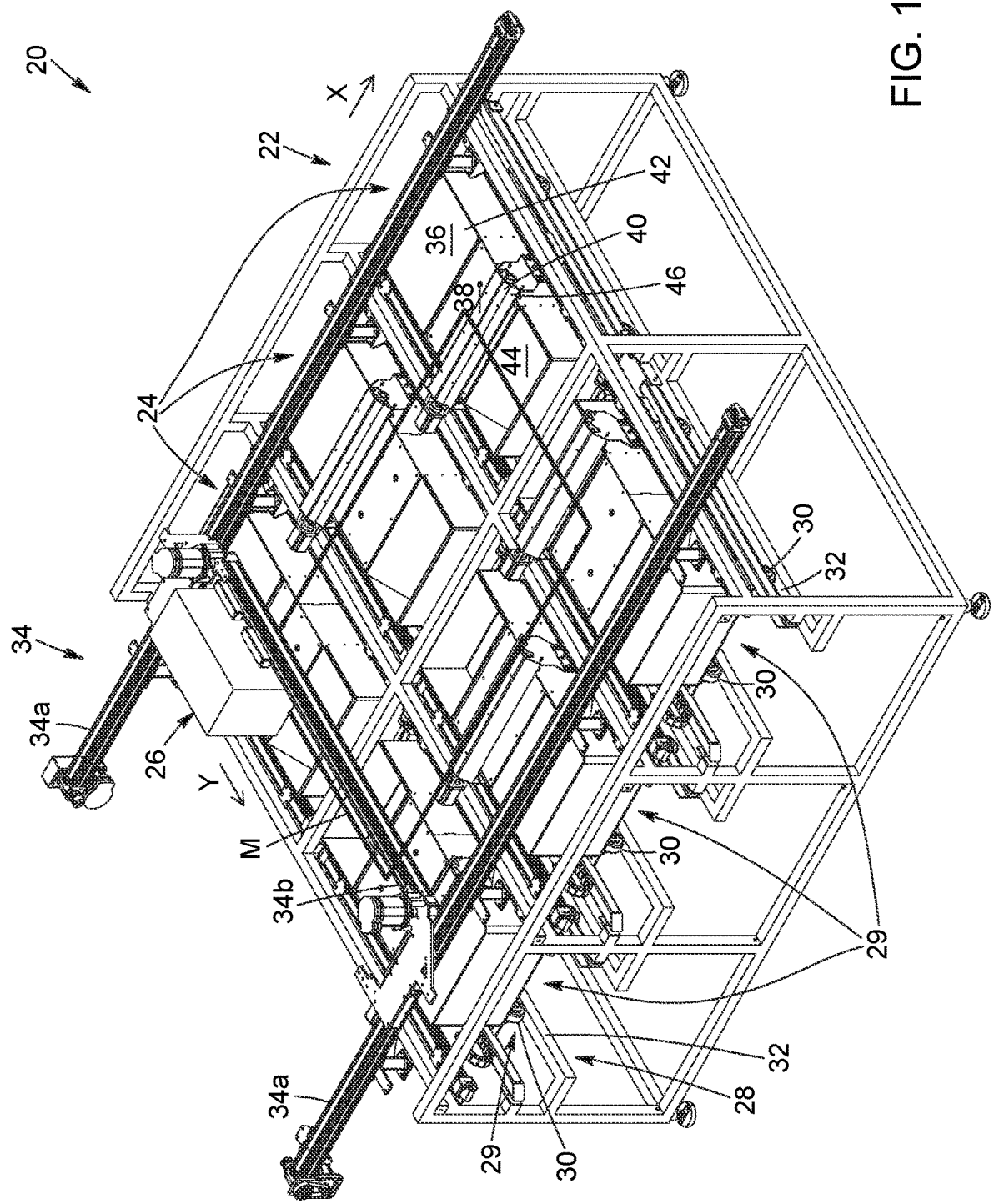
FIG. 1 is a perspective top view of a modular additive manufacturing system including a guiding assembly adapted to a rectangular manufacturing path.

Techniques described herein relate to modular and continuous additive manufacturing of three-dimensional parts that can be adapted for industrial mass production. The additive manufacturing system which is detailed is a modular system including at least one bonding module cyclically cooperating with each and every one of a plurality of build modules. Each build module is tailored to a specific material and manufacturing settings, thereby increasing production speed and yield compared to existing additive manufacturing systems.

As used herein, the expression "additive manufacturing" refers to manufacturing techniques, methods or processes, that fabricate parts by selective layering of a material according to build instructions from a digital file. The material can be a metal, a polymer, a resin, a ceramic, a composite, paper or a biological matter or a combination of the said materials. For instance, and without being limitative, materials include food compositions, pharmaceutical compositions, cell scaffolds, polymer-metal composites, carbon fiber and fiberglass composites, graphene and sand. Depending on the material to be added, additive manufacturing techniques include material extrusion, material jetting, binder jetting, sheet lamination, vat photopolymerization, powder bed fusion, directed energy deposition, and any variations of these techniques. The expression "3D printing" is known to be synonymously used to designate additive manufacturing, but it is not exact since 3D printing originally refers to binder jetting, and is therefore a specific technique among a variety of additive manufacturing techniques. The expression "additive manufacturing" is used in the present description to cover a plurality of techniques available to one skilled in the art to fabricate parts by successive and selective layering of a material according to build instructions from a digital file.

As used herein, the term "material" or the expression "build material" refers to the substance or matter that is to be deposited on the build platform and build area and bonded by the bonding module. Examples of build material include: polymers, resins, metals, food compositions, pharmaceutical compositions, cell scaffolds, polymer-metal composites, carbon fiber and fiberglass composites, graphene and sand.

As used herein, the term "deposition" or "depositing" refers to the formation of a material layer having an exposed surface. Therefore, the expression "layer deposition module" refers to any device which is able to spread material and control the thickness of the layer, including but without being limitative a rolling shaft, a recoater blade, a liquid or gas spraying device or a wiper depending on the nature of the material to be deposited as a layer.

As used herein, the term "bond" or "bonding" refers to the phenomena occurring when layers of a material are selectively solidified together by depositing or projecting a binder, exposing to light, crystalizing, or joining such material on the exposed material layer according to the employed additive manufacturing technique. Therefore, the term "bonding" can refer to fusing, sintering (e.g. powder bed fusion), melting (e.g. material extrusion, directed energy deposition), binding (e.g. binder jetting), curing (e.g. vat photopolymerization), or gluing (e.g. sheet lamination).

As used herein, the expression "bonding module" refers to a device selectively solidifying the material via various means which are able to perform the above-mentioned actions, including a device for projecting a binder (e.g. via extrusion head, nozzles), a device for depositing a binder (e.g. inkjet printhead), a device for curing the material (e.g. via UV light projector, UV light laser), or a device for fusing or sintering the material (e.g. via laser head, electron beam gun).

As used herein, the expression "build assembly" is to be understood as including a build area and build platform onto which build material is deposited, and additional elements necessary to provide the build material onto the build platform such as a feed platform, a feed container, an excessive material chute or a resin feeding mechanism and reservoir. The build platform and additional elements can be referred to as forming a build module having a build area. Depending on the implementations described herein, the build assembly can further include a bonding module or a layer deposition device cooperating with the build module to bond a top layer of material or deposit a top layer of material onto the build platform.

Although embodiments of the additive manufacturing system and corresponding components thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the additive manufacturing system, as will be briefly explained herein and as can be easily inferred herefrom by a person skilled in the art.

Moreover, it will be appreciated that positional descriptions such as "above", "below", "forward", "rearward" "left", "right" and the like should, unless otherwise indicated, be taken in the context of the figures and correspond to the position and orientation of the additive manufacturing system and corresponding parts, with "above" corresponding to a position closer to a layer deposition device of the additive manufacturing system and "below" corresponding to a position closer to a bottom of a build container of the bonding modules of the additive manufacturing system. Positional descriptions should not be considered limiting. For example, a system could be working "upside-down" meaning that the bonding is under the build module, therefor pointing upwards. This could be useful in resin-based application for example.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value. It is commonly accepted that a 10% precision measure is acceptable and encompasses the term "about".

In the present description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Figure 9:
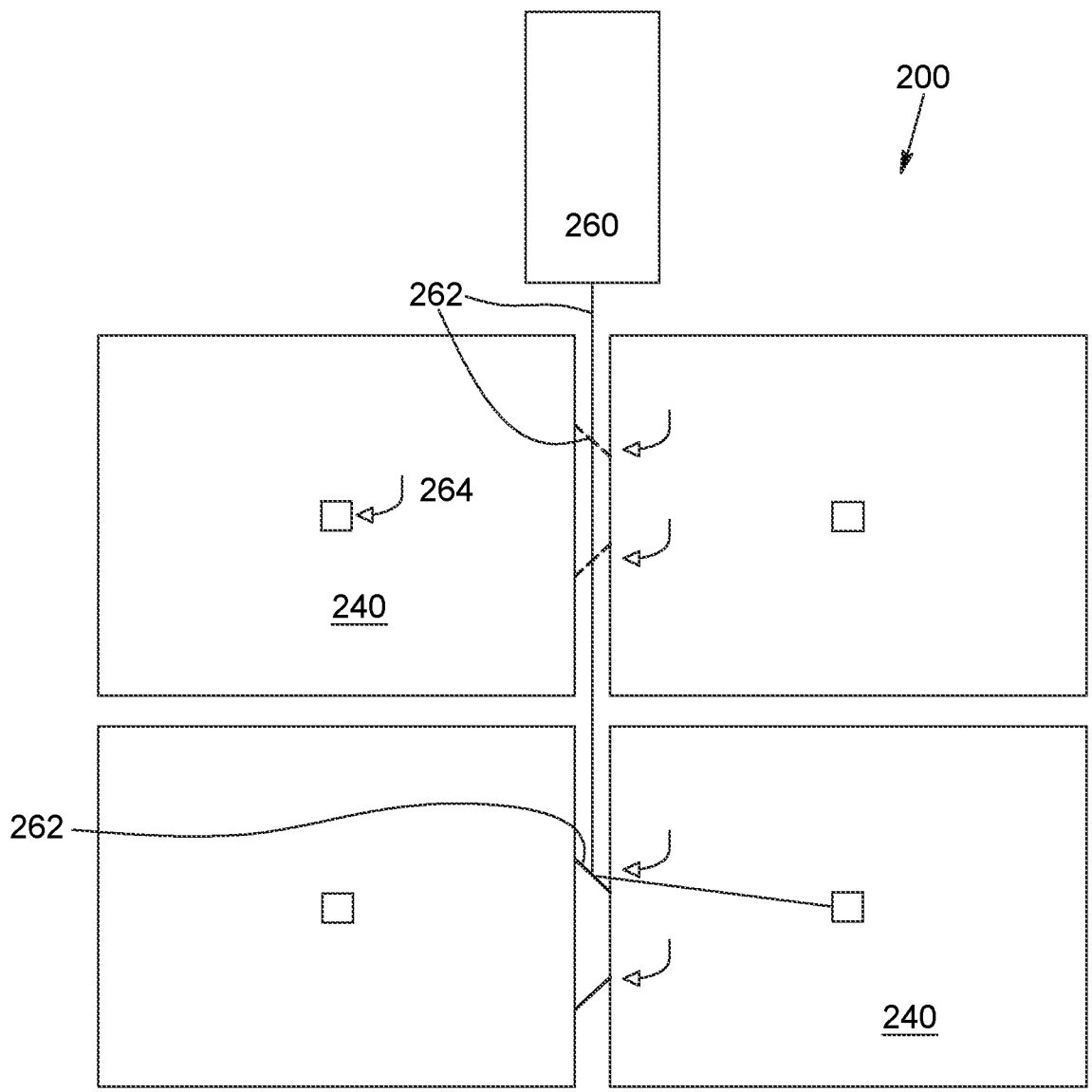
FIG. 9 is a schematic top plan view of a modular additive manufacturing system including an optical assembly for bonding build material, the optical assembly directing light to different build assemblies enabling reflectance of prepositioned mirrors.
Figure 10:
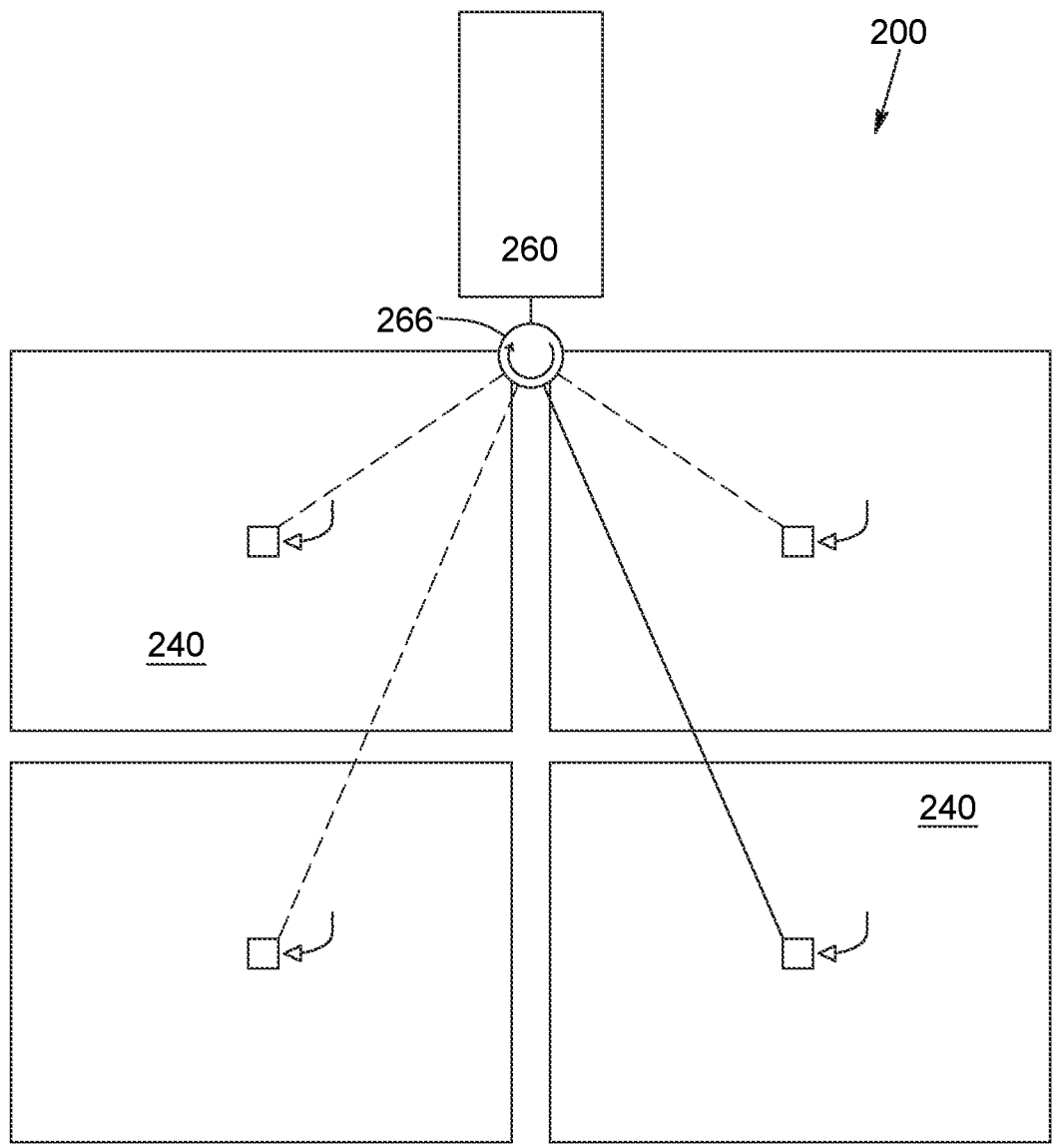
FIG. 10 is a schematic top plan view of a modular additive manufacturing system including an optical assembly for bonding build material, the optical assembly directing light to different build assembly via a mirror spinning on its Z axis.

The additive manufacturing system and related methods described herein enable a single source of bonding to be used for the bonding of an unbonded material layer cyclically deposited and exposed on multiple build platforms. FIGS. 1 to 7 illustrate various implementations of the additive manufacturing system wherein a single guidable module is displaced along a manufacturing path to perform periodic actions on a plurality of adjacently disposed build assemblies, each of the build assemblies being deposited with an unbonded layer of material. FIGS. 9 and 10 illustrate another implementation of the additive manufacturing system wherein a single and static source of bonding (e.g. laser) distributes light to the multiple building assemblies via a series of distributors (e.g. mirrors). It should be noted that most of the following description is drafted with the guidable module being a bonding module. However, one skilled in the art will readily understand that the same teachings can apply with the guidable module being a layer deposition device.

General System Implementations

In the implementation illustrated in FIG. 1, the additive manufacturing system 20 includes a framework 22 adapted to receive and support a plurality of modules at a specific distance with respect to the bonding module along its manufacturing path and in a given spatial configuration which can be tailored to the needs of the parts production. The system 20 includes six build modules 24 and one bonding module 26 which are mountable to the framework 22. The spatial configuration illustrated in FIG. 1 is a symmetrical configuration where the build modules are organized as first and second opposed and parallel rows of three build modules, the rows being symmetrical with respect to the X-axis. Various other configurations can be designed as will be further discussed and as exemplified in FIGS. 2 to 7. For example, the build modules can be arranged in nonparallel rows and can comprise more than three build modules per row.

It should be noted that different techniques can be used to support and mount the plurality of build modules onto the framework. The framework is configured to offer alignment of each build module with respect to a horizontal plane and to offer a spatial configuration tailored to the number of build modules and manufacturing path. The plurality of build modules can be mounted from the sides, the top or the bottom for example, as long as they are positioned to follow the manufacturing path and solidify the exposed layer of material on the build module.

For example, still referring to FIG. 1, the framework 22 can be made of vertical and horizontal frame members made of metal tubing joined by welding and configured for receiving the build modules 24. The framework 22 includes a guiding structure 28 which mate guiding elements 29 of each build modules 24 to ensure a sliding engagement of the build modules 24 with the framework 22. As shown, the guiding elements 29 include wheels 30 and the guiding structure 28 includes tracks 32 mating the wheels 30. Thus, each build module 24 is removably and slidably engageable to the guiding structure 28 of the framework 22. It can be appreciated that other guiding assemblies, cooperating with the framework and build modules, can be used such as and without being limitative, pillow blocks, linear rods, ball screw or tracks, rails, gantries or any other slidable guides.

Still referring to FIG. 1, each of the plurality of adjacent build modules 24 which are received in the framework 22 comprises a feed platform 36 and a build platform 38. The system 20 also includes a plurality of layer deposition devices 40, each device 40 being mountable to the framework 22 and engageable with a build module 24. It can be appreciated that the build modules 24 with their respective layer deposition devices 40 allow the system 20 to operate with several different materials at the same time. The build module 24 comprises a feed container 42 for containing build material. The feed platform 36 holds build material and is vertically slidable within the feed container 42 to provide a sufficient amount of material to be deposited in a layer of predetermined thickness on the build platform 38.

The build platform 38 is thus configured for receiving vertically stacked layers of build material with the layer deposition device 40 depositing build material from the feed platform 36 to the build platform 38. The build platform 38 is also vertically translatable upon successive layering and bonding of the build material deposited on this vertically translatable portion. In other words, the feed platform 36 slides vertically upwards so that the required amount of build material can be layered by the layer deposition device 40 and the build platform 38 slides vertically downwards for further layering of build material. The build modules 24 also include an excess material chute 44 receiving excess build material from the build platform 38 upon layering by the layer deposition device 40. The excess material chute can be designed to further extend on the sides of the build modules 24 to contain material overflowing from the sides of the build modules 24 (not shown on the Figures). In the non-limitative embodiment shown on FIG. 1, the layer deposition device 40 slides along the edges of the build module 24 along a direction parallel to the Y-axis above the feed platform 36, the build platform 38 and the excess material chute 44. The layer deposition device 40 includes a recoater blade 46 but it can be appreciated that other devices for layering build material according to the nature of the material (e.g. powder, liquid) can be used such as and without being limitative a wiper, a rolling shaft or any type of material spreading device.

In alternative implementations which are not illustrated in the Figures, the layer deposition device can be mounted on the corresponding build module. It should further be noted that the layer deposition device can be adapted to spread liquid material, such as liquid resin, on the previously solidified resin layers. The layer deposition device can provide build material from the surroundings of the solidified part under building, such as when the technique involves liquid resin being spread on the previously solidified layer by a blade or a similar spreading component.

In alternative implementations which are not illustrated in the Figures, the system can include a material hopper, working with or as part of the layer deposition device, and in place of the feed container and feed platform, for providing build material to the build platform. The material hopper would supply the material for the next layer to be layered by the layer deposition device.

Guiding Assembly Implementations

Different techniques can be used to support and mount the bonding module onto the framework. The framework is configured to offer alignment of the bonding module with respect to a horizontal plane so as to maintain an even distance between an active surface of the bonding module displaced along the manufacturing path and the exposed material layer of the building module. More particularly, the framework can include a guiding assembly enabling displacement of the at least one bonding module with respect to the build modules along a manufacturing path M defining a loop, such that specific actions of the bonding module are cyclically repeated for a same build module, thereby ensuring continuous part production.

In the non-limitative embodiment shown on FIG. 1, the bonding module 26 is guided above the build modules 24 and more precisely, above the build platform 38 of each build module 24. It can be appreciated that the bonding module may travel under the build modules or on the periphery of the build modules. It can also be appreciated that the bonding module may be stationary as further described below. However, the mobility of the bonding module can enable convenient build module removal and can reduce vibrations compared to moving build modules on a conveyor for instance, which may affect the quality of the parts produced by additive manufacturing. The additive manufacturing system may also include additional bonding modules mountable to the guiding assembly and movable along the manufacturing path to reduce the layer bonding cycle time and increase the production capacity of the machine.

It should also be understood that the at least one bonding module can be displaced along the manufacturing path via translational and/or rotational movements depending of the mechanisms that are included in the guiding assembly. Translational movements refer herein to a translation along the X-axis and the Y-axis; and rotational movements refer herein to a rotation about the Z-axis. The guiding assembly of the present system is therefore designed and configured according to the manufacturing path and related layout of the build modules.

Referring to FIG. 1, the build modules 24 are stationary and the bonding module 26 is translatable with respect to the build modules 24 along the X-axis and Y-axis. The framework 22 includes the guiding assembly 34, composed of guiding rails and translation connectors, which can slidably engage the bonding module 26 to enable displacement of the bonding module 26 with respect to the build modules 24. The guiding assembly 34 includes a pair of spaced apart and parallel guiding rails 34a extending longitudinally along the X-axis and a guiding rail 34b extending longitudinally along a Y-axis. Thus, the two X-axis guiding rails 34a extend across the first and second row of three build modules respectively, and the Y-axis guiding rail 34b extends across two opposed build modules of respective first and second rows. The X-axis guiding rails 34a are stationary and ends of the Y-axis guiding rail 34b are slidably connected, via X-axis translation connectors 35a, to the X-axis guiding rails 34a, such that the Y-axis guiding rail 34b can be displaced between and along the X-axis guiding rails 34a. The bonding module 26, which is slidably engaged via Y-axis translation connectors 35b, within the Y-axis guiding rail 34b, can therefore move in the X-axis direction upon displacement of the Y-axis guiding rails 34b along the X-axis guiding rails 34a, and in the Y-axis direction upon displacement of the bonding module 26 along the Y-axis guiding rail 34b. The additive manufacturing system 20 can comprise motors (not shown) to actuate the translation connectors along the X and Y axes, thereby enabling the sliding movement of the rail 34b and/or bonding module 26.

Figure 2:
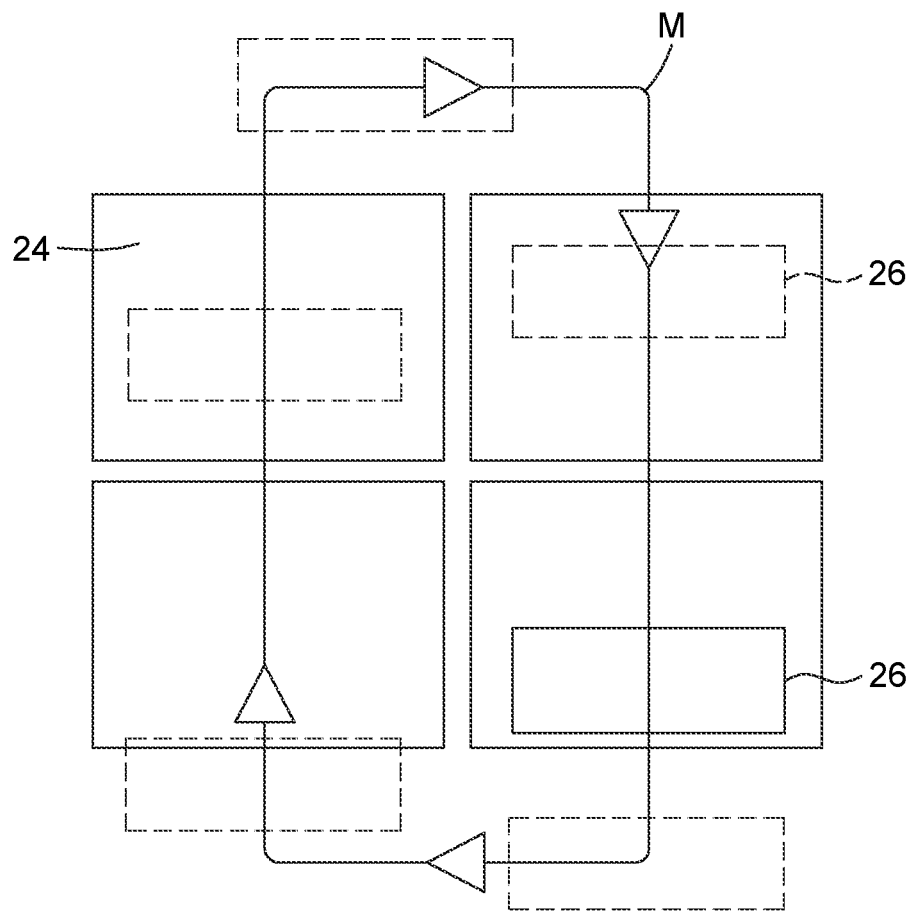
FIG. 2 is a schematic top plan view of a modular additive manufacturing system including build assemblies adjacently positioned in a configuration of two rows of two build assemblies and a guidable module guided along a manufacturing path having a rectangular shape.
Figure 3:
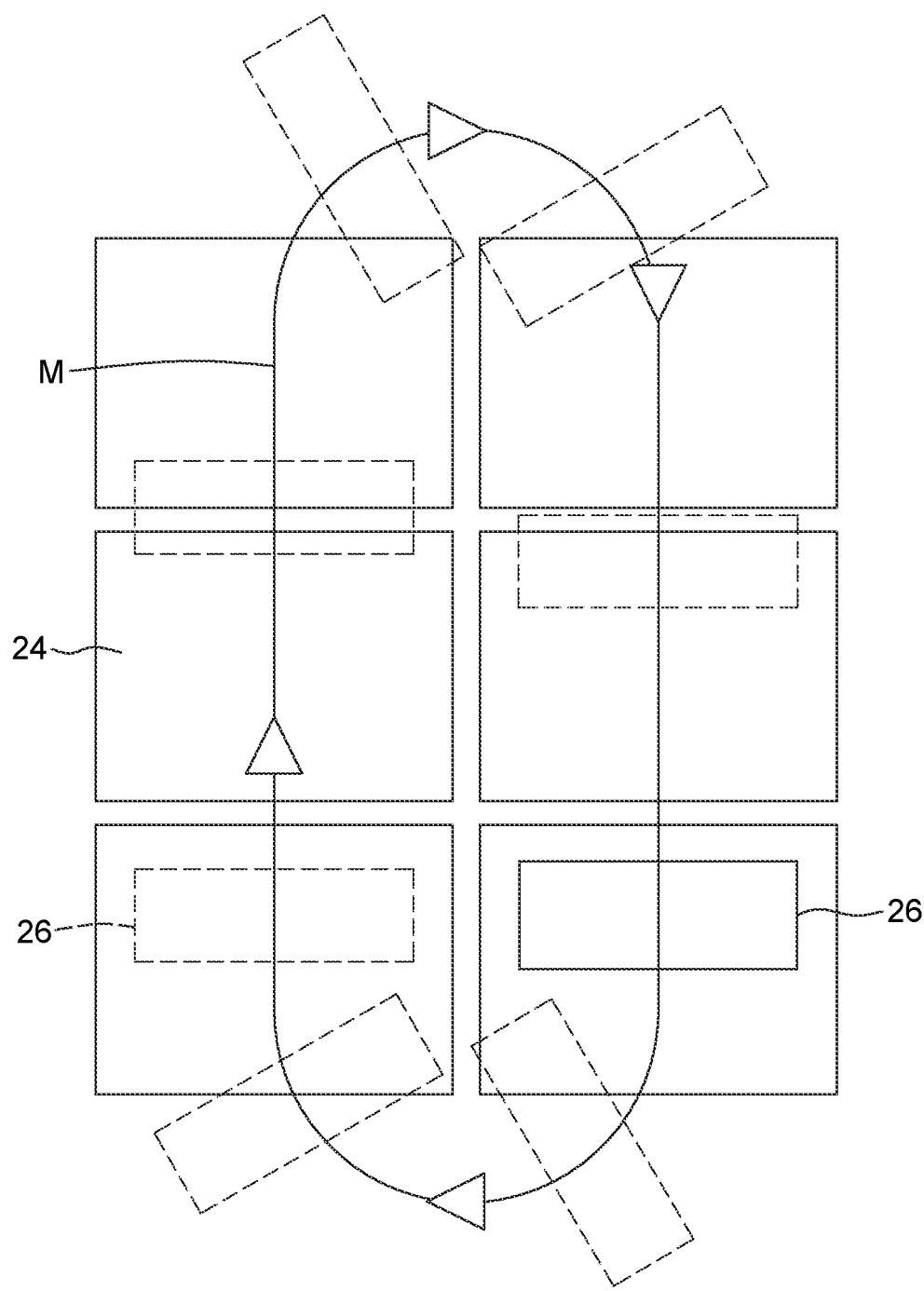
FIG. 3 is a schematic top plan view of a modular additive manufacturing system including build assemblies adjacently positioned in a configuration of two rows of three build assemblies and a guidable module guided along a manufacturing path having a discorectangular shape.
Figure 4:
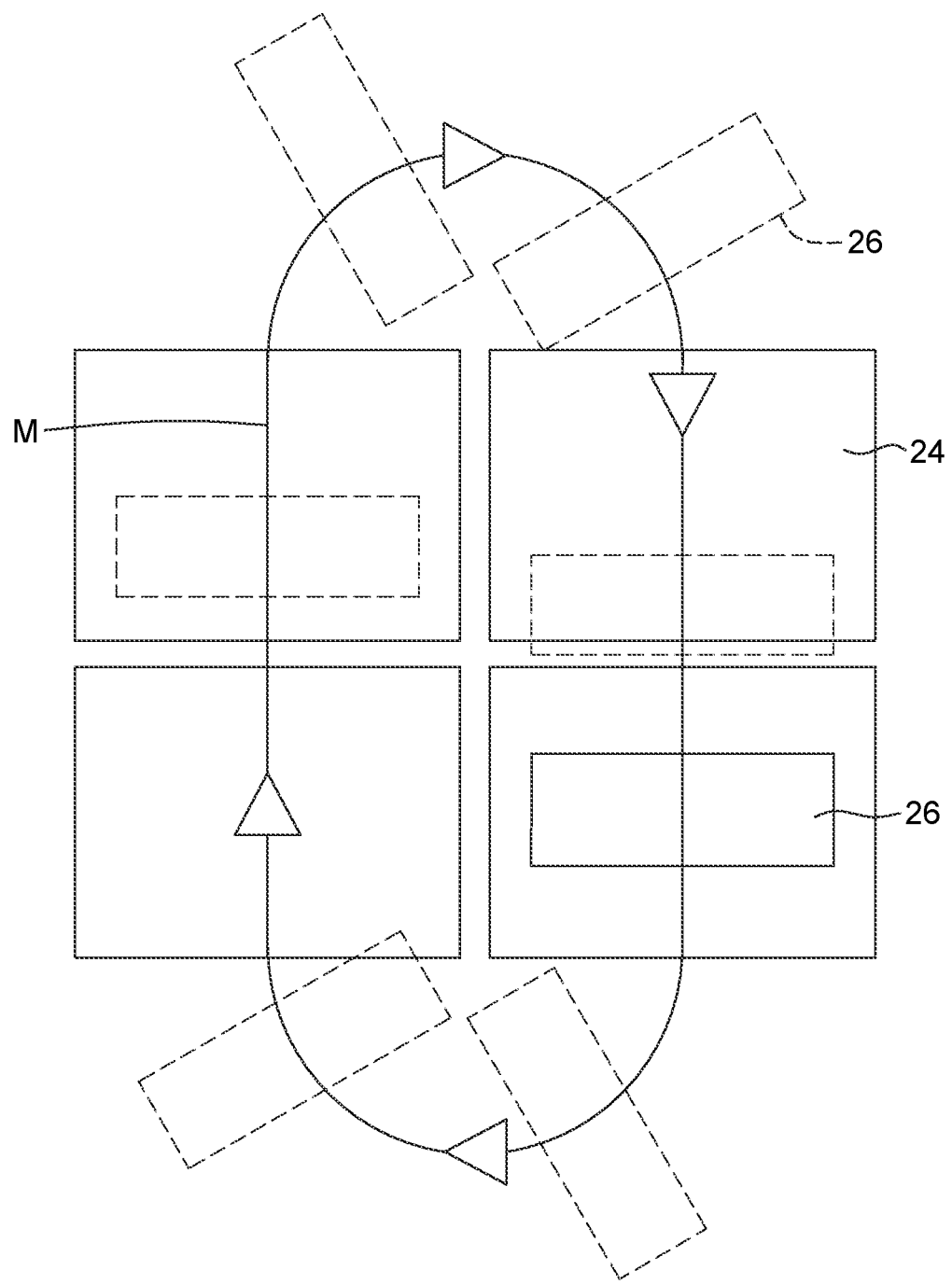
FIG. 4 is a schematic top plan view of a modular additive manufacturing system including build assemblies adjacently positioned in a configuration of two rows of two build assemblies and a guidable module guided along a manufacturing path having a discorectangular shape.
Figure 5:
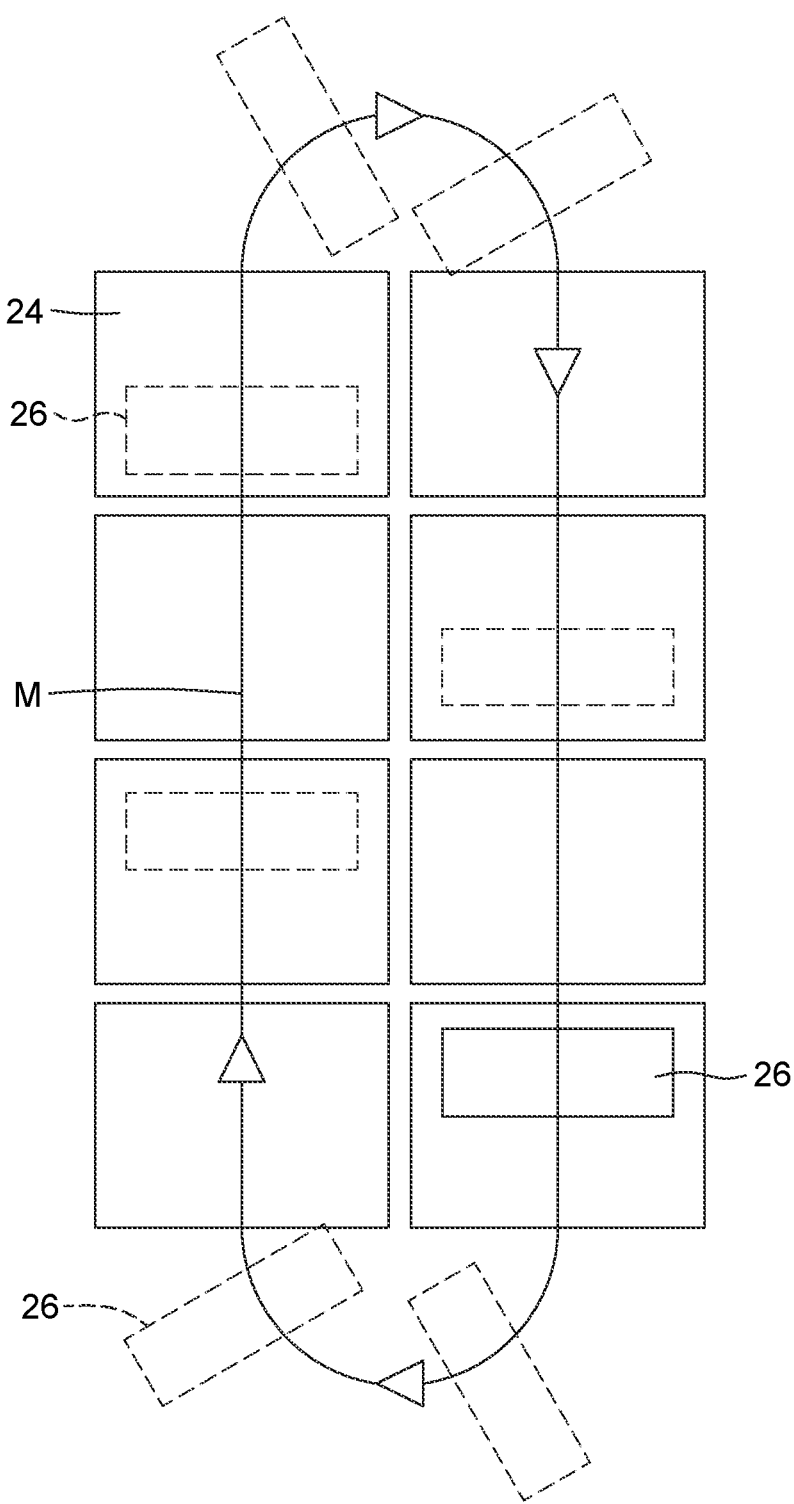
FIG. 5 is a schematic top plan view of a modular additive manufacturing system including build assemblies adjacently positioned in a configuration of two rows of four build assemblies and two guidable modules guided along a manufacturing path having a discorectangular shape.

The system exemplified in FIG. 1 includes a guiding assembly made of rails and translation connectors (being also referred to as sliding elements), which can be actuated by motors to displace the at least one bonding module along a rectangular manufacturing path similar to the manufacturing path and related configuration shown in FIG. 2. However, as readily understood by one skilled in the art, the guiding assembly can include alternative elements, differing from the assembly shown in FIG. 1, and which are able to move the at least one bonding module (or the build modules) along to the manufacturing path. For example, and without being limitative, chains and gears, belts and pinions or timing belts or a linear motor could be used to ensure said displacement. In another embodiment, the guiding assembly can include at least one rotation connector enabling the bonding module to rotate on its Z axis, thereby defined a rounded manufacturing path as shown on FIGS. 3, 4, 5, 6, and 7. The guiding assembly can further include, for example, a chain/belt and sprocket/pinion assembly to carry the bonding module along the manufacturing path. The bonding module is attached to the belt or chain, for example, and they would be driven by pinions or sprockets respectively. Such assembly would replace the cartesian guiding assembly (including rails oriented along X and Y axes). Such elements can provide an alternative guiding assembly which reduces the number of mechanical components and reduces vibrations. However, such assembly may induce additional centrifugal force which could prevent the use of bonding modules sensitive to perceived gravitational force vector such as bonding modules containing liquid and moving components such as a laser galvanometer. In addition, the use of a rotation electrical connector may be unreliable for bonding modules requiring a high number of electrical wires, fast communication and low electrical noise, thus reducing maximum system speed or even preventing its use.

Figure 11:
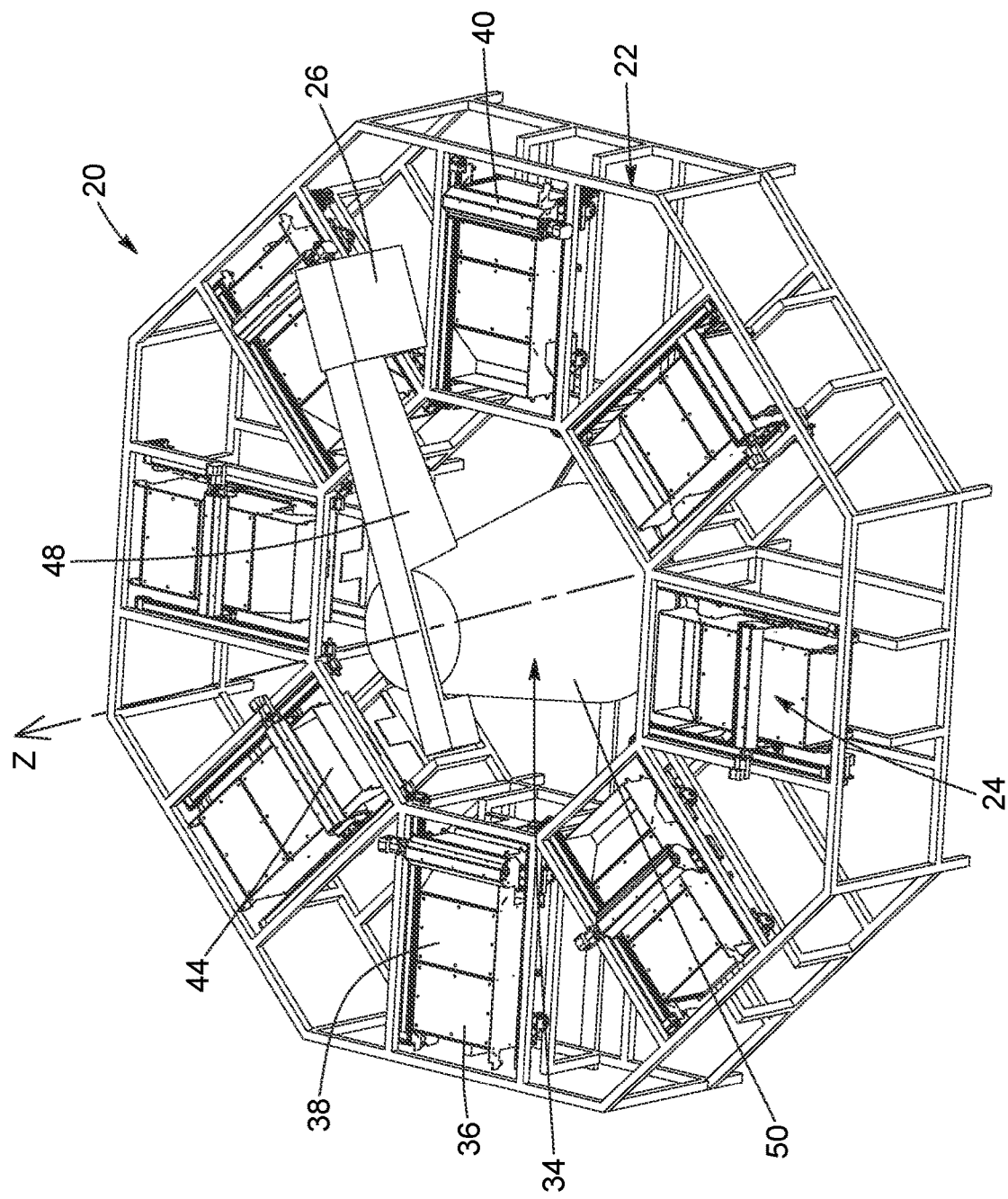
FIG. 11 is a perspective top view of a modular additive manufacturing system including a guiding assembly enabling rotation of the guidable module above a circular layout of build assemblies.

In another embodiment, as seen in FIG. 11, the guiding assembly 34 is configured to guide the bonding module 26 along a circular layout of the build modules 24, thereby defining a circular manufacturing path. The guiding assembly 34 includes an elongated arm 48 having a proximal end connected to a central and rotatable base 50, extending upwardly from a floor surface so as to maintain a distal end of the elongated arm 48 at a distance above the build modules 24. The bonding module 26 is connected to the distal end of the elongated arm 48 and follows a circular manufacturing path, upon rotation of the base 50 about the Z-axis.

In some implementations, the elongated arm can be made of a hollow trunk, thereby defining a cavity wherein components, sensitive to centrifugal force, as well as electronic components, such as controller(s), can be placed proximal to a center of rotation thereof. In some implementations, wireless communication can be used between the controller(s) and specific electrical components of the system, such that only the main electrical power would need to be interconnected by a rotation electrical connector as above-mentioned, thus avoiding several sensitive electrical signals going through the rotation electrical connector. Additionally, it would not be desirable to maximize the number of electronic components in the bonding module, because the additional weight conferred to the bonding module would reduce speed performance of the system.

Manufacturing Path Implementations

As illustrated in FIGS. 1 and 11, a single bonding module 26 can therefore be used to bond the material layers exposed by each build module by following the manufacturing path M defining a loop above the build modules 24. It should be understood that the manufacturing path can be adapted to any layout of the functioning build assemblies, and therefore be of rectangular, discorectangular, polygonal or circular tshape. The term "rectangular" refers to a shape having substantially the shape of a rectangle and that can have rounded corners, thereby being referred to as a rounded rectangular shape.

It should be noted that the term "loop" is not limited herein to a circular path and rather refers to a closed path which can be followed cyclically. FIGS. 2 to 7 are schematic top plan views of additive manufacturing systems which build modules are positioned in different configurations for optimizing the manufacturing path defining loops of various sizes and shapes.

The spatial configuration of the build modules defines the shape of the manufacturing path and can therefore be optimized depending on operating parameters that affect the bonding cycle time and the layer deposition cycle time. The bonding cycle time is the time required by the bonding module to travel its manufacturing path minus the time required to travel the distance on the manufacturing path where the bonding module interferes spatially with the material deposition module. The factors affecting the bonding cycle time can include the speed profile of the bonding module, the distance traveled by the bonding module, the distance where it interferes with the material deposition module, the number of bonding modules per manufacturing path and waiting times if there are any. The layer deposition cycle time is the time required by the material deposition module to make a new layer of material. The factors affecting the layer deposition cycle time can include the distance traveled by the layer deposition module, the speed profile of the layer deposition module, the additional time required to wait for the bonding to occur and other waiting times if there are any specific to the technique used.

Figure 6:
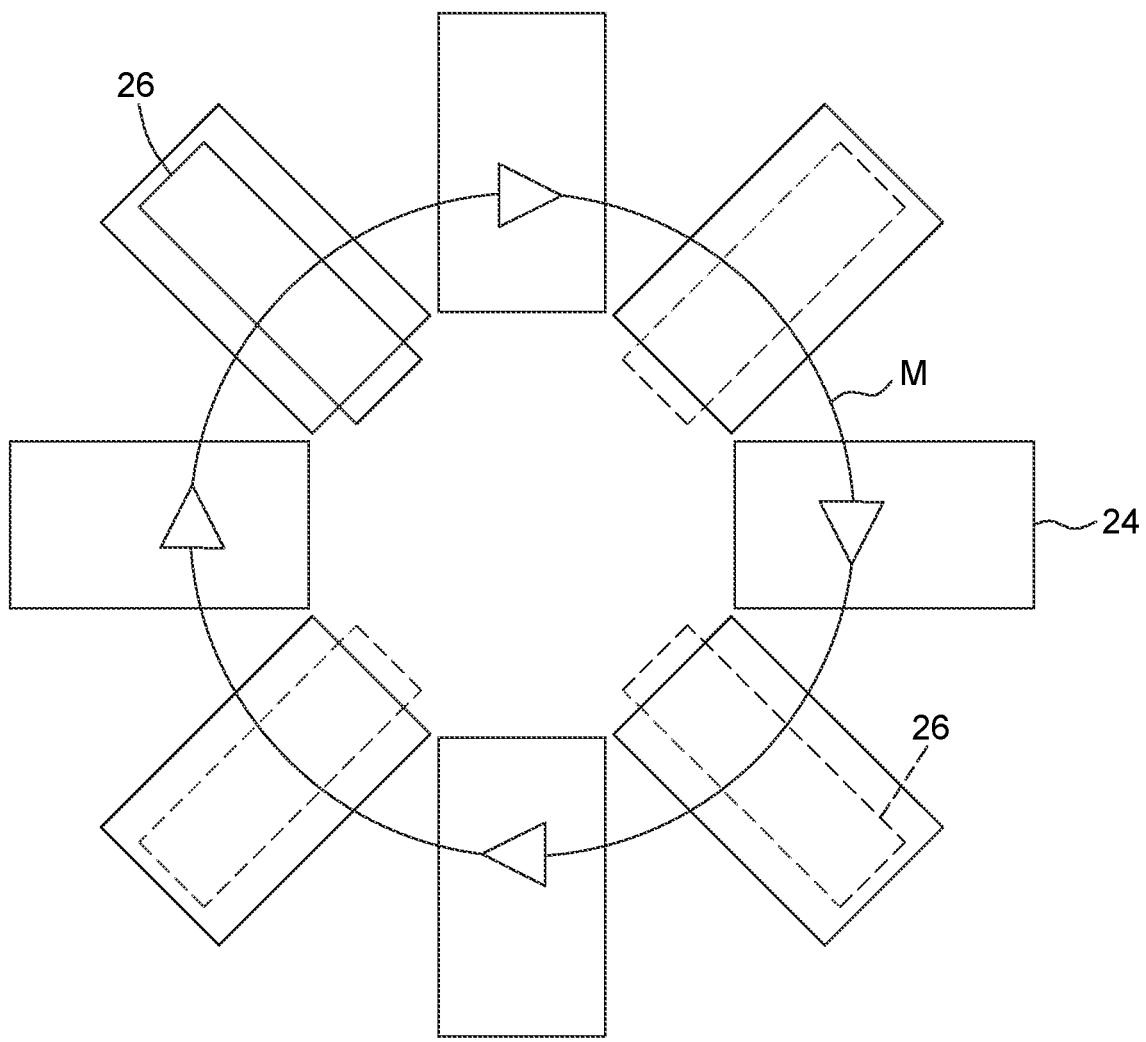
FIG. 6 is a schematic top plan view of a modular additive manufacturing system including build assemblies adjacently positioned in a circular configuration and a guidable module guided along a circular manufacturing path.
Figure 7:
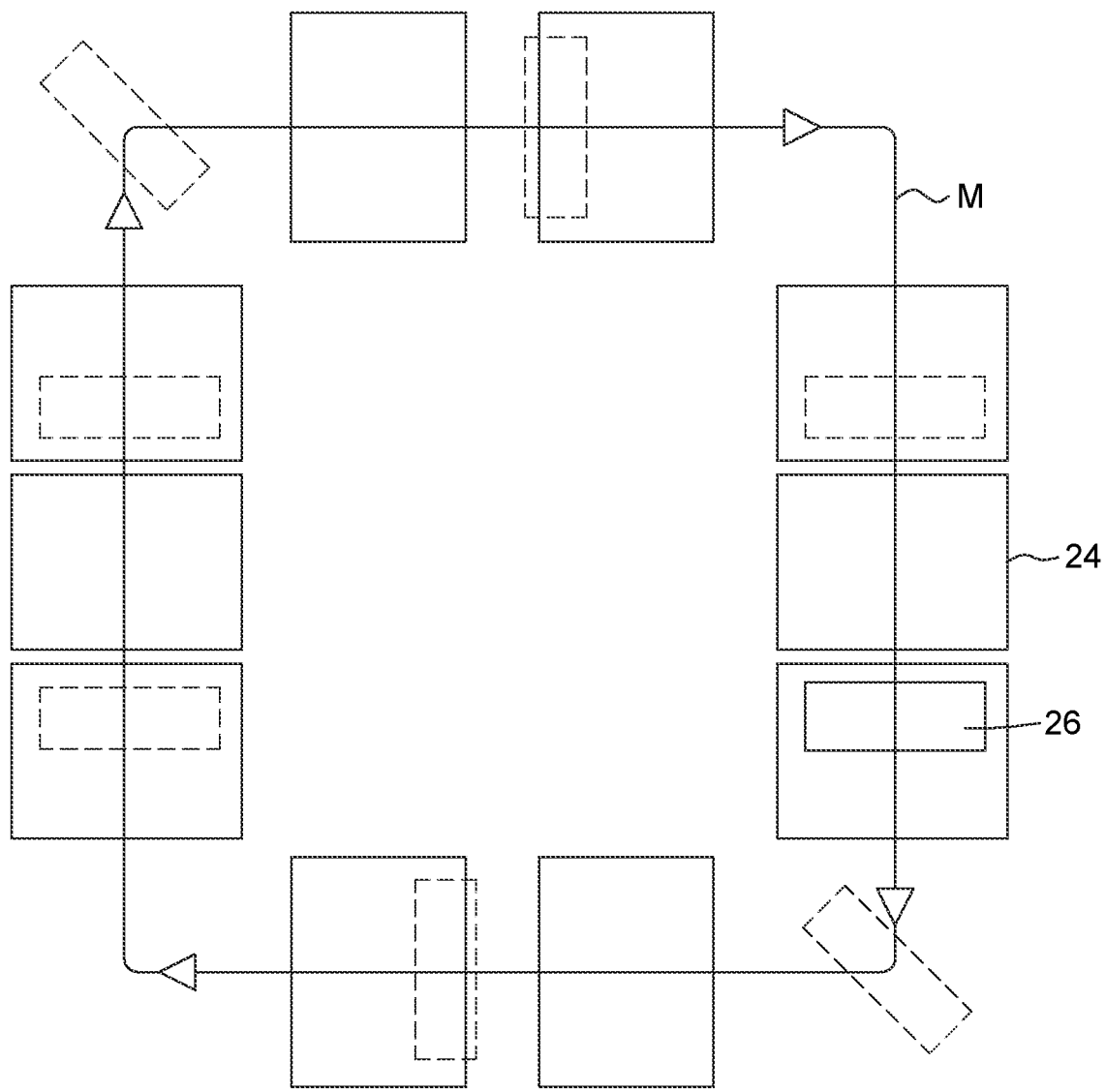
FIG. 7 is a schematic top plan view of a modular additive manufacturing system including build assemblies adjacently positioned in a configuration of two horizontal rows of two build assemblies, and two vertical rows of three build assemblies and a guidable module guided along a manufacturing path having a rounded rectangular shape.

As shown in FIGS. 2 to 7, adjacent build modules 24 can be positioned in a circular or star-like configuration which is tailored to a circular manufacturing path (FIG. 6). A rectangular configuration of two rows of several build modules can be tailored to a discorectangular manufacturing path (FIGS. 3 to 5) or a rectangular manufacturing path (FIG. 2). It should be noted that a discorectangular shape refers herein to a stadium or obround geometry. In other implementations, a rectangular manufacturing path can also be adapted to build modules being laid out as two opposed rows of several build modules oriented along the X-axis and spaced apart from one another with two other opposed rows of build modules oriented along the Y-axis, as seen in FIG. 7). It can thus be appreciated that the type of elements and configuration of the guiding assembly can vary according to the configuration of the build modules, for instance with guiding rails, belts, or chains defining a circular, rectangular or discorectangular path.

It should also be noted that various build modules layouts and manufacturing paths can be designed. One skilled in the art would readily understand how to choose a layout according to the number of build modules, bonding modules, material under bonding, and additive manufacturing techniques. For example, although a circular layout of the build modules is preferable for mechanical simplicity and vibration reduction, the circular layout can also take up much space, and end up not being as optimal as the rectangular layout for a same number of build modules. Additionally, the use of a circular layout, can result in a decreased production yield with respect to a rectangular layout, for a similar bonding module speed, because of the wasted space between adjacently and radially disposed build modules.

In some implementations, the system can include a plurality of bonding modules operatively connected to the guiding assembly so as to follow the manufacturing path which is tailored to the number of build modules and their layout. Indeed, one way to enhance the production yield of the system, as well as the bonding cycle time, is to increase the number of bonding modules on a same manufacturing path, the bonding modules being spaced apart along the manufacturing path. It should be noted that the use of multiple bonding modules may be particularly suited when displaced via a guiding assembly including belt/chain and pinion/sprocket assemblies or when using a plurality of rotating arms.

Referring to FIGS. 2, 3, 4 and 5 illustrating a discorectangular manufacturing path, additional bonding modules may be mounted on the same guiding assembly of a system to increase yield, instead of for example increasing the number of systems. To remain optimal when adding an additional bonding module on a system with the same constraints, the number of build modules per system needs to be increased and adjusted in order to maximize yield. Referring to FIGS. 6 and 7 illustrating a circular manufacturing path, the number of build modules can be proportionally chosen according to the number of bonding modules. For example, if one bonding module requires 6 build modules, two bonding modules will require about 12 build modules to obtain optimal operation of the system.

Stationary Bonding Module Implementations

Now referring to FIGS. 9 and 10, there is shown a schematic view of a system 200 including build modules 240 organized in two rows of two build modules, and a bonding module 260 being stationary. The stationary status of the bonding module is particularly suited when the bonding module 260 includes a light emitting device. In a non-limitative embodiment, the light emitting device includes a laser. In another non-limitative embodiment, the light emitting device includes a light projector. The additive manufacturing system 200 further includes an optical assembly, and more specifically a plurality of switchable mirrors 262, cooperating with the light emitting device of the bonding module 260 to selectively bond build material. Each of the switchable mirrors 262 can directs the light emitted by the light emitting device (i.e. the bonding module 260) towards XY scanning mirrors 264, which are oriented to direct the emitted light towards the exposed material surface layered on the build platform 240 along the X-axis and the Y-axis. Such mirrors 262 can be also referred to as lenses and are mechanically or electronically independently switchable so as to be oriented differently with respect to one another. For example, a first mirror 262 can be oriented to let the emitted light reaching another subsequent mirror 262 which is oriented differently so as to direct the light towards an XY mirror 264 of a build platform 240.

It should be noted that the term switchable or switch refers to the ability from the mirror or lens to be pivoted or rendered selectively opaque to control the light path.

It should be noted that various devices, differing from the mirrors 262 illustrated in FIG. 9, can be used to direct the light from the light emitting device to the XY scanning mirrors. For example referring to FIG. 10, the system 200 can include a single spinning mirror 266 which is able to selectively direct the emitted light to a plurality of the XY scanning mirrors 264.

Therefore, a single stationary bonding module may be used to selectively bond build material on each build module thus allowing bonding on a build module while depositing a new layer on other build module(s). One skilled in the art can readily appreciate that the system shown in FIG. 9 can offer enhanced precision, compared to the system shown in FIG. 10, because the angle of the mirrors 262 can be static and predetermined. However, the system shown in FIG. 10 can offer a simpler, and more compact solution with self-correcting capabilities.

Processing Implementations

Cooperation of the at least one bonding module with each of the plurality of build modules along the manufacturing path is dictated by the execution of build instructions which are specific to the part under production on each build platform, which enables each build module to produce different parts in different materials using different settings in a same production run.

As used herein, the expression "build instructions" refers to information typically generated by a CAD software, which is stored and executed by a control and processing unit which communicates with the various components of the additive manufacturing system to simultaneously fabricate a plurality of parts according to the executed information.

The build instructions include information related to a part to be built (e.g. position, orientation, size and shape), information relative to the bonding module (e.g. speed profile along the manufacturing path, laser power, material deposition drop profile, resolution and temperature), information relative to the layer deposition module (e.g. height of each layer, speed profile, heater temperature and rolling shaft speed profile) and other system-related parameters such as ambient temperature, pressure, humidity, and safety sensor settings. It should be noted that the build instructions relate to any instructions needed for the system to produce parts and can be generated to fabricate several parts, each part being produced on a specific build module, such that the build instructions can also include motion instructions for the bonding module between several build modules.

Figure 8:
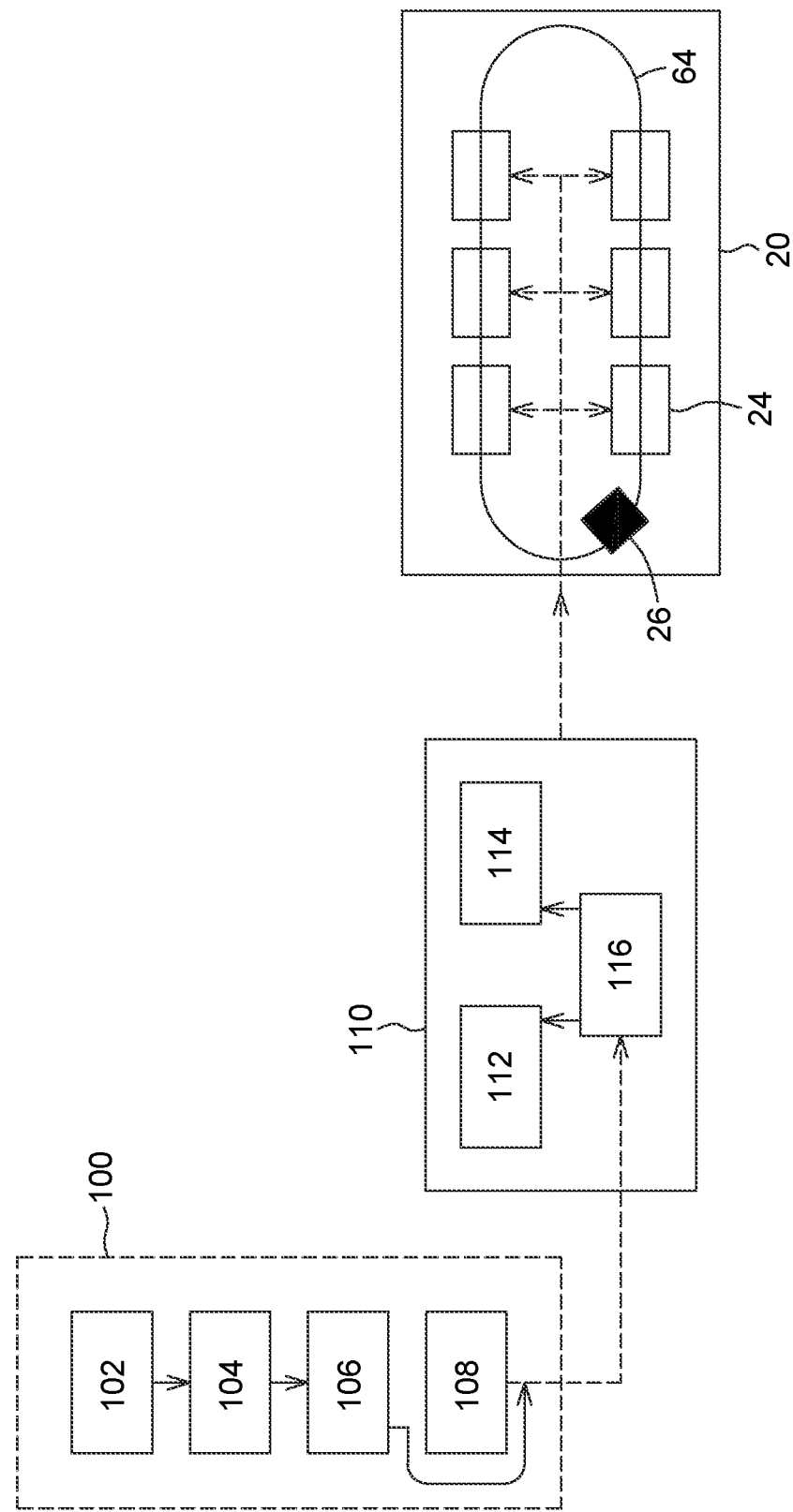
FIG. 8 is a general flowchart of a method for building parts based on build instructions.

FIG. 8 schematically illustrates the elements needed to generate build instructions 100, and their operation within the system 20 via a control and processing unit 110 executing the build instructions 100. Build instructions 100 are generated from one or multiple 3D models. The generation of the build instructions 100 includes processing the 3D model 102, e.g. by scaling operation, and placing and rotating the 3D model on a virtual build platform 103 in the desired layout, e.g. by placing multiple parts on one build platform. Each part can be modified according to the used additive manufacturing technique, e.g. by closing the surface of the model, adding supports, hollowing the model, etc. The generation of build instructions 100 further includes the execution of a slicing algorithm 106 which divides the 3D model in a plurality of 2D slices (i.e. layers), referred to as slicing information 106. The generation of build instructions 100 further includes combining the slicing information 106 with motion information 108 related to the motion of the modules and elements of the system (i.e. build platform, bonding module, layer deposition device). The slicing information 106 and the motion information 108 constitute the build instructions 100 which are stored and executed by the control and processing module 110.

The control and processing module 110 refers to a unit which controls and executes, at least partially, the build instructions to communicate with and operate with the various modules and elements of the system including, but not limited to, the bonding module, the build module, the layer deposition device, a power unit, elements of the framework, a build module locking mechanism, building platform heating units, ambient temperature, humidity and pressure control units, safety units, etc. The control and processing unit 110 may also communicate with other systems and equipment to optimize the part manufacturing process and to ensure continuous part production. For example, the control and processing unit 110 can further communicate with a management software, external conveyor modules, collaborative and non-collaborative robotic units, automated guided vehicles, or a combination thereof.

In some instances, the control and processing unit 110 can also be referred to as a "control unit", a "controller" or a "computer device". The control and processing unit 110 as described herein is to be understood as comprising a processor and a memory (which can also be referred to as a "computer readable storage medium"). The control and processing module 110 can be provided within one or more general purpose computers and/or within any other suitable computing devices, implemented in hardware, software, firmware, or any combination thereof, and connected to the various modules and elements of the additive manufacturing system via appropriate wired and/or wireless communication links and ports. As the case may be, the control and processing unit 110 may be integrated, partially integrated, or physically separate from the hardware of the system.

The processor of the control and processing module 110 may implement operating systems, and is able to execute computer programs, also generally known as commands, instructions, functions, processes, software codes, executables, applications, and the like. It is noted that expression "build instructions" is therefore used to refer to any type of computer code or file (e.g. software, instructions file or microcode) that can be employed to program the processor such that it can operate adequately the modules and elements of the system. The processor may include a single processing entity or a plurality of processing entities. For example, a first processing entity 112 can be dedicated to the control of the motion of the modules and elements of the system (related to execution of the motion information 108 of the build instructions 100), and a second processing entity 114 can be dedicated to the actual bonding of the material layers at each build module according to the slicing information 106 of the build instructions 100 and other bonding parameters such as laser power, scanning speed, extrusion temperature, etc. depending on the additive manufacturing technology and material that are chosen for each build module.

Accordingly, the processor may include or be part of one or more of a computer, a microprocessor, a microcontroller; a coprocessor, a central processing unit (CPU), an image signal processor (ISP), a programmable logic controller (PLC), a digital signal processor (DSP) running on a system on a chip (SoC), a dedicated graphics processing unit (GPU), an image processing unit, inkjet drive electronics, head interface board, optical system unit, a special-purpose programmable logic device embodied in a hardware device such as, for example, a field-programmable gate array (FPGA) or an application-specific integrated circuit (ASIC), a digital processor, an analog processor, a digital circuit designed to process information, an analog circuit designed to process information, a state machine, and/or other mechanisms configured to electronically process information and to operate collectively as a processor. Particularly, the terms "processor" and "controller" should not be construed as being limited to a single processor or a single controller, and accordingly, any known processor or controller architecture may be used.

It can be appreciated that the build instructions may be different or the same for each build module. It can also be appreciated that different additive manufacturing technologies and materials may be used on each build module. Each build module can be independently controlled with module-specific parameters. Referring to FIG. 8, the control and processing module 110 may include or be coupled to a memory 116 capable of storing the build instructions to be retrieved by the processing entities (112, 114). Depending on the application, the memory 116 can include one or more memory elements. In some instances, the memory 116 can also be referred to as a "computer readable storage medium". It should further be noted that the memory 116 is able to store several sets of build instructions 100, each set being tailored to the production of a part of one build module. The control and processing unit 110 is thereby able to simultaneously operate several build modules (or build areas) according to build instructions dictating different settings (e.g. resolution, axis movement profiles, overshot, waiting time, material). The build modules can also be operated according to build instructions being in progress and others being put in a queue, enabling continuous manufacturing operations.

As mentioned above, the control and processing unit can, via a dedicated processing entity, control the movements of the bonding module along the manufacturing path according to the production being carried on each build platform. Thus, the bonding module will travel along the continuous manufacturing path following its motion cycle when at least one build module has a layer that is not bonded. For example, it can be appreciated that the control and processing unit, via the modification of build instructions, is able to operate the dynamic reduction of the manufacturing path to bond the exposed material from functioning build modules when other build modules of the system are not in use or enabled.

In another example, one skilled in the art will readily understand that the build instructions can also be construed such that the control and processing unit is able to dictate acceleration reduction, speed reduction, waiting time of the modules in certain portion of the manufacturing path, thereby reducing mechanical wear and tear of the elements of the system. It can also allow maintenance of specific elements located in zones of the system which are not covered by the bonding module.

It can be appreciated that communication sent from a system, device or module to another can be hereby often referred to as a signal. Communication or signal can be a simple electrical signal sent from an output to an input electrical connection, but it can also mean a more complex communication, wired or wireless. The purpose of a signal is to activate a module, device or component, to send feedback to or from another module, device or component or to send or receive information or parameters.

In some implementations, specific signals generated by the modules and elements of the system itself, are additionally used to monitor and control operation of the system.

For example, referring to FIG. 1, each one of the layer deposition devices 40 can be configured to generate a position or bonding signal upon spreading build material on the build platform 38, the position signal indicating where the layer deposition device 40 is located and the bonding signal indicating a completed layering operation. It can be appreciated by one of skill in the art that the layering operations are conducted almost simultaneously on the build modules 24, more specifically on the build platforms 38 of the build modules 24, so as to allow the bonding of the build material on a build module 24 while layering is completed on an adjacent module 24, thereby lowering the time it takes to manufacture a series of parts in comparison with existing additive manufacturing systems. For example, the absence of bonding signal can be used as a warning leading to stopping the system operation as a layering operation is abnormally unfinished. It can also be accomplished by comparing a position signal to the position of another module or to another type of actual or virtual trigger indicating that the operation is abnormal (e.g. the position of one module or device is not the expected value).

In another example, a build detector comprising a layer height sensor for detecting a height of stacked layers can communicate the height of the build platform to the control and processing unit, thereby detecting the completion of a part, which can trigger the removal of the build module from the framework of the system to remove the completed part, replenish the material feedstock, perform maintenance operations, etc.

In some implementations, sensors such as encoders, proximity sensors, limit switches, and rotary sensors, can provide precise information on the position of the layer deposition devices, the build and feed platforms and the bonding module. The system is thereby able to synchronize some or all of the moving devices of the system to work cooperatively in a continuous manufacturing operation. It is therefore possible that the bonding module displacement along the manufacturing path over build modules be synced with other modules and devices in order to pass over a build module as soon as the layer deposition device is out of the way. In some implementations, synchronization can be led by a specific module, device or component where, for example, the position of a module dictates the position of other modules. For example, the position of devices and modules, such as the layer deposition module and the build and feed platforms, can be dependent on the position of the bonding module. In any case, sensor data can prevent synchronisation problems such as collisions, as well as provide a starting signal to another step in the manufacturing process.

In other implementations, synchronization of the modules and elements of the system can be performed according to the build instructions generated by a software. It is possible, although not recommended for reliability and safety reasons, that the system be synced by time, with or without the support of sensors that would provide a position value to the system.

The devices and modules can alternatively be activated to execute their position and speed profiles without being constantly synced with other modules, but by being activated at precise times to ensure proper movement during the manufacturing operations.

Method Implementations

The general method of operation of the system is further described in addition to a method for optimizing the system to provide an enhanced yield of production for a given build module layout. The methods described herein generally refer to step that can be cyclically repeated according to a process cycle. The process cycle can be understood as including direct and indirect steps which are necessary to deposit a new material layer over the build area of one build module and to selectively bond this new material layer. Each step of the process cycle is periodically repeated until the building of a part or of a series of parts is completed.

It should be understood that steps of the process cycle can vary according to the build modules layout and shape of the manufacturing path. As shown on FIG. 1, the bonding module 26 travels along the X-axis guiding rails 34a and the Y-axis guiding rail 34b from a build module 24 to another adjacent build module 24 in a continuous trajectory. It can be appreciated that the bonding module may travel in a clockwise direction along the manufacturing path M or in a counterclockwise direction along the manufacturing path M. When the bonding module 26 is above a build platform 38, upon which a layer of build material has been deposited by the layer deposition device 40, the bonding module 26 selectively bonds the layered material. In the non-limitative embodiment shown on FIG. 1, which can be used with the binder jetting technology, the bonding module 26 has a width sufficient to cover the surface of the build platform 38 in a single pass. The additive manufacturing system 20 is configured so that the bonding module 26 selectively bonds build material at once, regardless of the additive manufacturing technology used, by travelling over or under the build platforms or from the peripheral sides of the build platforms. The bonding operation is triggered by the bonding module 26 receiving communication or a signal from the control and processing unit (not shown). When the bonding operation is completed on a build platform 38, the control and processing unit activates a subsequent layering operation. The layer deposition device 40 then deposits another layer of build material on the previously bonded layer. This sequence enables successive layering and bonding of the build material on different build modules, reducing operation cycle time in contrast to existing additive manufacturing systems.

In reference to FIG. 1, the bonding and layering sequence is repeated on each build module 24 with the bonding module 26 travelling along the manufacturing path M, until the building of a part or a series of parts on a build platform 38 is completed. Upon completion of part fabrication in the build module 24, the control and processing unit (not shown) will communicate with the controller(s) or generate a signal to disengage a build module 24 from the framework 22 and enable subsequent insertion of another build module 24 engaging with the framework 22. The control and processing unit will thereby disengage the build module 24 from the guiding structure 28 to remove the build module 24 from the framework 22 and enable subsequent insertion of another build module 24 engaging with the guiding structure 28.

Therefore, a build module or multiple build modules are removed while manufacturing of parts on other build modules is carried out. If a post-treatment or subsequent operation, such as part removal from build material, is required on the build modules that are removed, it can therefore be done without delaying production. As mentioned above, the build modules 24 have wheels 30 and are mounted to the framework on tracks 32, thus enabling simple and quick change of a completed build task on a build module for a new build module with little to no downtime. It can be appreciated that the change of build modules may be carried out manually or may be automated. The removal of a build module 24 from the framework 22 can also be done to replenish the feed container 42 with build material. It can also be appreciated that in an alternative embodiment, the disengagement of a build module from the framework can be activated by a manual user input.

Existing systems typically have a process cycle time that equals the layer deposition cycle time plus the layer bonding cycle time plus various time delays between cycles, whereas the present system is configured such that the process cycle time is advantageously calculated as the longest of one of the layer deposition cycle time or of the sum of the layer bonding cycle time and the interference time.

As used herein, the process cycle time $\overline{T_p}$ refers to the entire duration of the layer production (including deposition and solidification) which varies according to the constraints of the system as well as the additive manufacturing technique used. It varies with respect to the time taken by the system to deposit and bond a new layer of material on each required build module and be ready to start a new cycle. The process cycle time $\overline{T_p}$ is repeated until the building of a part or of a series of parts is completed.

As used herein, the layer deposition cycle time $\overline{T_d}$ refers to the duration of the layering operation which varies according to the technology, components, and material which can be provided as a powder, a liquid, a sheet, or a filament. More specifically, the layer deposition time takes into account the duration needed to perform operations including lowering or raising of the feed platform and of the build platform, preparation time (motor acceleration, heating, liquid fulfilment, electronic signal delays) of the layer deposition device, build material layering action time, layer leveling time (if necessary) and the movement and action time of the layer deposition device required to return to an initial state or position.

As used herein, the layer bonding cycle time $\overline{T_b}$ refers to the duration of the selective bonding for one exposed material layer. This duration primarily varies according to the technology and components of the bonding module. The layer bonding cycle time varies more specifically according to the displacement of the bonding module along the manufacturing path as well as parameters, such as position and speed profile of the bonding path, length of the perimeter of the manufacturing path and various waiting times, if necessary. The layer bonding cycle time may also depend on treatments applied to a layer such as and without being limitative heat treatment, UV treatment ultrasonic treatment or cooling treatment.

As used herein, the interference time $\overline{T_i}$ refers to the duration for which the bonding module and the layer deposition module can come into collision while following the manufacturing path for one layer. The duration of $\overline{T_i}$ primarily varies according to the chosen additive manufacturing technology and components. $\overline{T_i}$ varies more specifically according to the displacement of the bonding module along the manufacturing path as well as parameters such as the position and speed profile, the dimensions of the components that can interfere with each other and the distance along the manufacturing path on which components can interfere with one another.

As used herein, the yield refers to the output of bonded material resulting from the operation of the present system. The yield varies with respect to the used additive manufacturing technique, components, configuration, constraints and more. The yield can be expressed in units or parts, but it can also be expressed in area of potentially bonded material per unit of time. As a precise example, yield can be expressed as objects or $\overline{cm^2/h}$ of potentially bonded material.

Figure 12:
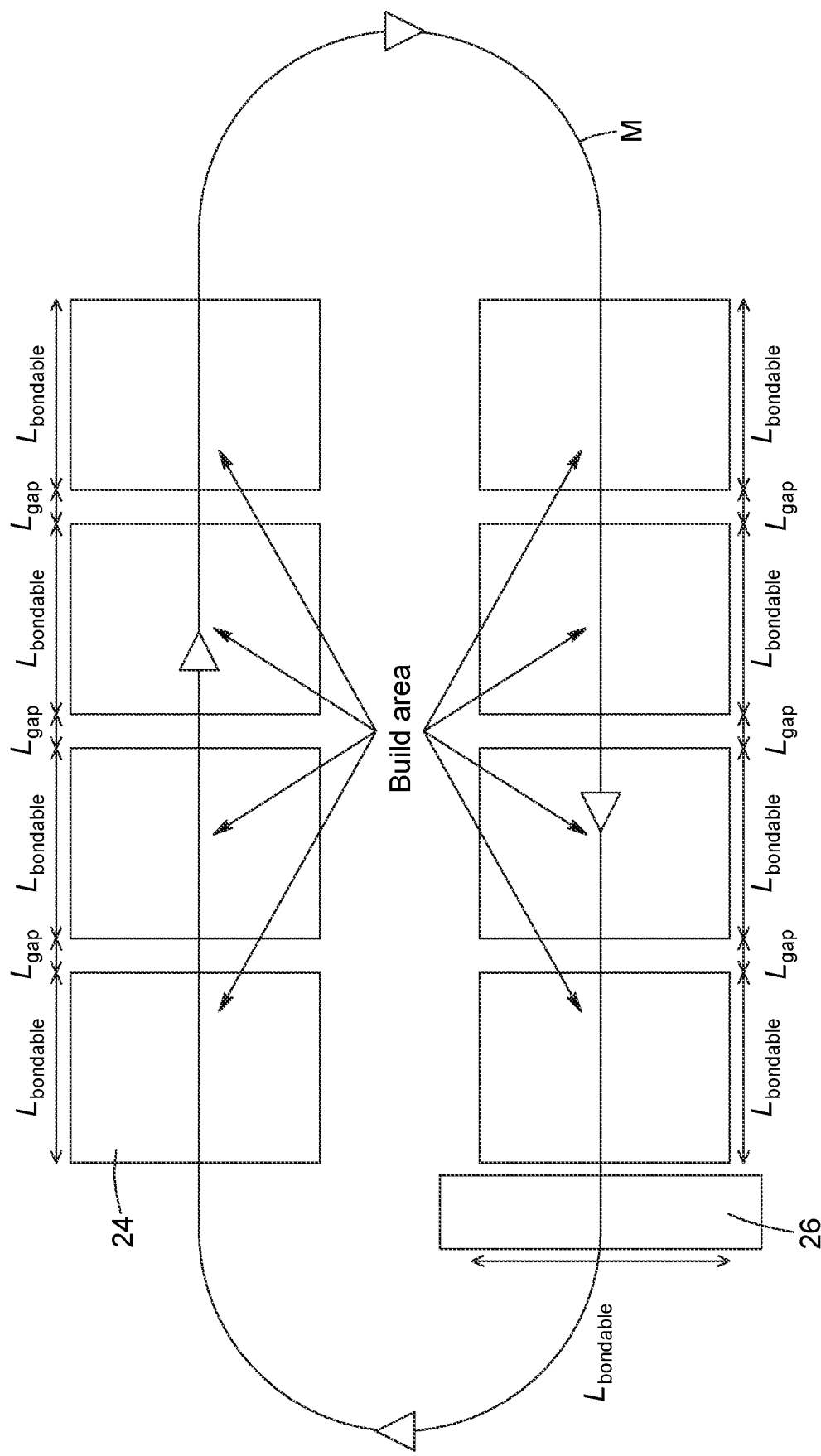
FIG. 12 is a schematic and annotated top plan view of a modular additive manufacturing system including two rows of build assemblies and a guidable module guided along a discorectangular manufacturing path.

As used herein, constraints refer to the various limiting factors and parameters of a given application. Although there are numerous variables at play, one skilled in the art can appreciate that there are often constraints that prevent a system from being infinitely productive. The limiting factor sources can include the selected technology, component performances, physical, mechanical, chemical, software or electrical limitations, associated costs, physical footprint, operational limitations or any constraint or limitation that prevent the system to be optimal. For example, referring to FIG. 12, a system can be limited by the speed at which layer bonding or layer deposition can be done, by the width of the layer deposition device (referred to as layer deposition module in FIG. 12) $L_{layer\ deposition\ device}$, build area spacing $L_{gap}$, the size of the build areas, equipment costs, maximum footprint permitted, operating labor required and more.

As used herein, the ratio of effective travel $\overline{R_T}$ refers to the ratio of the time during which the bonding module can be potentially bonding material ($\overline{T_{potentially\ bonding}}$) over the process cycle time $\overline{T_p}$.

As used herein, the bonding speed $\overline{S_b}$ refers to the average speed of the bonding module while the bonding module is potentially bonding material and while the bonding module is following the manufacturing path.

As used herein, the build area refers to an area on which material can be bonded. It can be appreciated that the size of the build area is not necessarily equal to the size of the build module. The build area can be of any shape but needs to be bigger than the parts that need to be manufactured in a given application. For simplification purposes only, a build area of rectangular shape with its width perpendicular to the speed direction (velocity) along the manufacturing path would be composed of a bondable length $\overline{L_{bondable}}$ and a bondable width $\overline{l_{bondable}}$ both perpendicular to each other.

As used herein, the build area spacing $\overline{l_{bas}}$ refers to the distance between the edges of build areas along the manufacturing path, thereby representing a distance separating two adjacent build areas where the bonding cannot occur.

As used herein, the effective bonding time $\overline{t_{ef}}$ refers to the sum of all durations when the bonding module is potentially bonding material and passing the build area spacings $\overline{l_{bas}}$. The duration starts when the bonding module can start bonding the first build area and ends when it cannot bond the last build area for every individual direction.

As used herein, the manufacturing direction $\overline{P_m}$ refers to the number of direction changes that the bonding module will encounter along the manufacturing path. In an embodiment similar to FIGS. 2, 3, 4 and 5, the number of manufacturing direction $\overline{P_m}$ would be equal to 2. In FIG. 6 it would be equal to 0 because the direction is constant and in FIG. 7 it would be equal to 4.

There is provided a method to optimize the yield of the additive manufacturing system depending on the configuration and constraints of the system. More specifically, there is provided a method to optimize the cycle process time $\overline{P}$ in order for the system to be designed for optimal yield.

It can be appreciated that in order to find an optimal system, the cycle process time $\overline{P}$ can be chosen to be as close as possible, and even equal, to the sum of the layer deposition cycle time $\overline{T_d}$ and the interference time $\overline{T_i}$ according to formula I. The layer bonding cycle time $\overline{T_b}$ can be also chosen to be as close as possible, or even equal, to the cycle process time $\overline{T_p}$ according to formula I.

$$\overline{T_p} = \overline{T_d} + \overline{T_i} = \overline{T_b} \quad (I)$$

Among several possible ways to optimize the system, the layer deposition cycle time $\overline{T_d}$ and layer bonding cycle time $\overline{T_b}$ can be optimized to build a system with optimal yield while respecting the various constraints of a given application.

With a given set of constraints, an optimal number of build areas $\overline{N}$ for a given system can be found in order to optimize the process cycle time $\overline{T_p}$. The optimal number of build module N will ensure that the system has a ratio of effective travel $\overline{R_T}$ along its manufacturing path that is as high as possible, thus improving yield while keeping the layer deposition cycle time $\overline{T_d}$ at least as close as possible to the process cycle time $\overline{T_p}$.

For example, if the build areas are of rectangular shape and evenly spaced in each manufacturing direction $\overline{P_m}$ of the manufacturing path, the optimal number of build areas $\overline{N}$ can be found with the following formula II:

It can be appreciated that the resulting optimal number of build areas $\bar{N}$ is indicative of an optimal target but may not be an integer. One skilled in the art will readily understand that the optimal number of build areas $\bar{N}$ can be rounded to the nearest integer. In a case where the process cycle time $\bar{T}_p$ is inferior to the layer deposition cycle time $\bar{T}_d$ one must avoid collisions by, for example, lowering the bonding speed $\bar{S}_b$ while remaining as close as possible to the sum of the layer deposition cycle time $\bar{T}_d$ and the interference time $\bar{t}_i$.

The yield of a proposed system can be calculated with the product of the ratio of effective travel, of the bonding speed $\bar{S}_b$ and of the bondable width $\bar{l}_{bondable}$ which is perpendicular to the speed direction (velocity), according to formula III.

$$Y = R_t \cdot \bar{S}_b \cdot \bar{l}_{bondable} \quad (III)$$

It is thus appreciated that a system can optimized for enhanced yield by finding the optimal number of build areas $\bar{N}$ given the constraints of the system for a given additive manufacturing application.

One skilled in the art will readily know how to adapt formulas II and III to systems having a manufacturing path different from rectangular geometry.

With the above-described embodiments of the additive manufacturing system, there is also provided a method for building, in a continuous manner, three-dimensional parts in successively bonded layers based at least on part build instructions. The method is carried out by providing a system comprising a framework, a plurality of adjacent build modules mountable to the framework, a bonding module mountable to the framework with each build module comprising a build platform configured for receiving vertically stacked layers of build material and, if required by the manufacturing technique, a feed platform holding build material. The system also comprises a plurality of layer deposition devices, each layer deposition device cooperating with one build platform. Then, the method includes depositing build material on the build platform by engaging the layer deposition device with build material held in a hopper, around the previously solidified build material or on the feed platform to the build platform in a layer and communicating with the control and processing module(s) indicating a completed layering operation. After, the method includes moving the bonding module according to the manufacturing path along the build platform of each one of the plurality of adjacent build modules and selectively bonding the build material layered on the build platform of each one of the plurality of adjacent build modules according at least to part build instructions when receiving instructions to act accordingly from the control and processing module. Finally, the method includes repeatedly activating a subsequent layering operation, thereby enabling successive layering and bonding of the build material on different build modules. The method may also include a step of disengagement of a build module from the guiding structure of the framework and subsequent engagement of another build module with the guiding structure. Thus, the method also includes removing one or a plurality of build modules from the guiding structure by having the build modules roll on tracks of the guiding structure and replacing these modules by build modules configured for receiving layers of build material and further part building. Optionally, the method may further include adapting the speed profile (speed, acceleration, deceleration and waiting time) and position of the bonding module(s) to the layout and operation of the build modules. Optionally, the method may further includes dynamically reducing a size and shape of the manufacturing path when one or more build module(s) are not under layering operation.

It will be appreciated that the methods described herein may be performed in the described order, or in any suitable order.

One skilled in the art will readily understand that, e.g. when a material jetting technique is used, the above-described system configurations can be used with bonding modules taking the place of the layer deposition modules, and at least one layer deposition module taking the place of the at least bonding module along the manufacturing path. In such case, the present description can interchangeably refers to the bonding module when mentioning the layer deposition module and vice versa, unless two aspects are mutually exclusive. For example, a layer deposition module could be selectively jetting an uncured resin following a manufacturing path while a bonding module on each build module is curing the said resin using a UV light-emitting device.

Computer Readable Medium and Computer Device Implementations

The present system can include a non-transitory computer readable storage medium having stored thereon the build instructions (which are computer readable instructions) that, when executed by the processor, cause the processor to perform the method steps as described herein to produce parts on a plurality of build modules by a bonding module. The terms "computer readable storage medium" and "computer readable memory" are intended to refer to a non-transitory and tangible computer product that can store and communicate executable instructions for the implementation of various steps of the methods disclosed herein.

The computer readable memory can be any computer data storage device or assembly of such devices, including random-access memory (RAM), dynamic RAM, read-only memory (ROM), magnetic storage devices such as hard disk drives, solid state drives, floppy disks and magnetic tape, optical storage devices such as compact discs (CDs or CDROMs), digital video discs (DVD) and Blu-Ray™ discs; flash drive memory, and/or other non-transitory memory technologies. A plurality of such storage devices may be provided, as can be understood by one skilled in the art. The computer readable memory may be associated with, coupled to, or included in the processor configured to execute the build instructions contained in a computer program stored on or in the computer readable memory and relating to various functions associated with the processor.

In some implementations, the non-transitory computer readable storage medium having stored thereon the build instructions that, when executed by the processor, can cause the processor to perform one or more of the above-described method steps such as triggering deposition of a layer of new material on the build area of a build module; triggering the bonding of the new layer of material by the bonding module; moving, accelerating, decelerating or stopping the bonding module along the manufacturing path; removing a build module for which a part is completed on its build area, etc.

In some implementations, the non-transitory computer readable storage medium having stored thereon the build instructions that, when executed by the processor, can cause the processor to take an action in response to the position of the bonding module along the manufacturing path. As noted above, the action taken can include triggering, by the processor, the deposition of a new layer of material on a specific build module of the plurality of build modules.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A method for simultaneously building three-dimensional parts in successively bonded layers based at least on build instructions, the method comprising the steps of:
   providing a plurality of build assemblies to define a manufacturing path;
   enabling at least one build assembly to function according to the build instructions,
   wherein the at least one functioning build assembly is triggerable to perform:
      a layering operation including depositing a top layer of build material in response to the build instructions, the top layer of build material being unbonded; or
      a bonding operation including bonding the top layer of build material to form a bonded layer, the bonding operation being performed after the layering operation is completed;
   displacing at least one guidable module along the manufacturing path and at a distance with respect to the plurality of build assemblies, wherein the at least one guidable module is triggerable according to the build instructions to perform:
      the layering operation including depositing the top layer of build material in response to the build instructions, when the bonding operation is performed by the at least one functioning build assembly; or
      the bonding operation including bonding the top layer of build material to form the bonded layer, when the layering operation is performed by the at least one functioning build assembly;
   wherein depositing and bonding of the top layer of build material are performed periodically by the at least one functioning build assembly or the at least one guidable module until completion of a three-dimensional part;
   wherein the bonding of the top layer of build material from one functioning build assembly or guidable module is performed simultaneously to the deposition of the top layer of build material on remaining build assemblies or guidable module; and,
   wherein the at least one functioning build assembly is capable of being configured to perform the layering operation and capable of being configured to perform the bonding operation.

2. The method of claim 1, comprising adapting a speed profile and position of the at least one guidable module to the manufacturing path and at least one of the layering operation or bonding operation on each functioning build assembly.

3. The method of claim 1, wherein the at least one guidable module is a bonding module, and the bonding of the top layer of build material for each functioning build assembly comprises displacing the bonding module along the manufacturing path for performing the bonding operation after completion of the layering operation from one functioning build assembly to another functioning build assembly.

4. The method of claim 3, comprising syncing the displacement of the bonding module and the deposition of the top layer of build material on each build assembly to activate the bonding operation by the bonding module as soon as each top layer of build material is deposited along the manufacturing path.

5. The method of claim 1, wherein the at least one guidable module is a layer deposition device, and the deposition of the top layer of build material for each functioning build assembly comprises displacing the layer deposition device along the manufacturing path for performing the layering operation after completion of the bonding operation from one functioning build assembly to another functioning build assembly.

6. The method of claim 5, comprising syncing the displacement of the layer deposition device and the bonding of the top layer of build material on each build assembly to activate the layering operation by the layer deposition device as soon as each bonded layer is formed along the manufacturing path.

7. The method of claim 1, comprising generating a signal or computer readable instructions upon completion of at least one of a layering operation or a bonding operation on one build assembly, and activating a subsequent bonding operation or layering operation on said build assembly based on said signal or computer readable instructions.

8. The method of claim 1, comprising replacing one build assembly with a new build assembly upon completion of the three-dimensional part on said build assembly, thereby enabling removal of the three-dimensional part without interrupting production of the three-dimensional parts of the build assemblies along the manufacturing path.

9. The method of claim 1, comprising adjusting a size of the manufacturing path to the functioning build assemblies.

10. The method of claim 1, wherein the manufacturing path is of rectangular, discorectangular, polygonal or circular shape.

* * * * *